US011990616B2

(12) United States Patent
Choi et al.

(10) Patent No.: US 11,990,616 B2
(45) Date of Patent: May 21, 2024

(54) POSITIVE ELECTRODE ACTIVE MATERIAL FOR LITHIUM SECONDARY BATTERY AND LITHIUM SECONDARY BATTERY INCLUDING THE SAME

(71) Applicant: ECOPRO BM CO., LTD., Cheongju-si (KR)

(72) Inventors: Moon Ho Choi, Cheongju-si (KR); Gyeong Jae Heo, Cheongju-si (KR); Hyun Jong Yu, Cheongju-si (KR); Jung bae Park, Cheongju-si (KR); Eun byeol Hyeong, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 275 days.

(21) Appl. No.: 16/563,359

(22) Filed: Sep. 6, 2019

(65) Prior Publication Data
US 2020/0083531 A1    Mar. 12, 2020

(30) Foreign Application Priority Data

Sep. 11, 2018  (KR) ................ 10-2018-0108210
Oct. 16, 2018  (KR) ................ 10-2018-0123130

(51) Int. Cl.
*H01M 4/525*    (2010.01)
*H01M 4/36*     (2006.01)
(Continued)

(52) U.S. Cl.
CPC ........... *H01M 4/525* (2013.01); *H01M 4/366* (2013.01); *H01M 10/0525* (2013.01); *H01M 2004/021* (2013.01); *H01M 2004/028* (2013.01)

(58) Field of Classification Search
CPC .. H01M 4/525; H01M 10/0525; H01M 4/366; H01M 2004/021; H01M 2004/028;
(Continued)

(56) References Cited

U.S. PATENT DOCUMENTS

2004/0110066 A1    6/2004  Hamano et al.
2010/0019194 A1    1/2010  Fujiwara et al.
(Continued)

FOREIGN PATENT DOCUMENTS

CN    105161710    * 12/2015    ........ H01M 10/0525
JP    2001-243949 A    9/2001
(Continued)

OTHER PUBLICATIONS

Machine translation of CN 105161710, retrieved from <www.espacenet.com> on Feb. 24, 2023.*
(Continued)

*Primary Examiner* — Cynthia K Walls
(74) *Attorney, Agent, or Firm* — Studebaker & Brackett PC

(57) ABSTRACT

The present invention relates to a positive electrode active material for a lithium secondary battery and a lithium secondary battery including the same. The positive electrode active material according to the present invention reduces the specific surface area and grain boundary of a secondary particle in which a side reaction with an electrolyte solution occurs to improve the high-temperature stability of the positive electrode active material and reduce gas generation caused by the positive electrode active material.

11 Claims, 16 Drawing Sheets

(51) Int. Cl.
*H01M 10/0525* (2010.01)
*H01M 4/02* (2006.01)

(58) Field of Classification Search
CPC .... H01M 4/1391; H01M 4/485; H01M 4/131; H01M 4/362; H01M 10/052; Y02E 60/10; C01P 2004/61; C01P 2004/84; C01P 2004/64; C01P 2004/50; C01G 53/50

See application file for complete search history.

(56) References Cited

U.S. PATENT DOCUMENTS

| | | | |
|---|---|---|---|
| 2010/0203388 A1* | 8/2010 | Kim | H01M 4/364 429/223 |
| 2011/0291044 A1* | 12/2011 | Wang | C01G 53/006 252/182.1 |
| 2015/0340689 A1* | 11/2015 | Song | H01M 4/5825 427/126.3 |
| 2016/0268594 A1 | 9/2016 | Kim et al. | |
| 2017/0352885 A1† | 12/2017 | Kondo | |
| 2020/0036006 A1 | 1/2020 | Choi et al. | |

FOREIGN PATENT DOCUMENTS

| | | |
|---|---|---|
| JP | 2008-270175 A | 11/2008 |
| JP | 2010-212260 A | 9/2010 |
| JP | 2012-517675 A | 8/2012 |
| JP | 2014-139926 A | 7/2014 |
| JP | 2017-188443 A | 10/2017 |
| JP | 2017188443 A2 † | 10/2017 |
| JP | 2019-160571 A | 9/2019 |
| KR | 20090094856 A † | 9/2009 |
| KR | 101577179 B1 † | 12/2015 |
| WO | 2012/176471 A1 | 12/2012 |

OTHER PUBLICATIONS

Jing Li et al., "Comparison of Single Crystal and Polycrystalline LiNi0.5Mn0.3Co0.2O2 Positive Electrode Materials for High Voltage Li-Ion Cells", Journal of The Electrochemical Society, May 23, 2017, p. A1534-p. A1544, vol. 164, No. 7.

Lei Wang et al., "Single-crystal LiNi0.6Co0.2Mn0.2O2 as high performance cathode materials for Li-ion batteries", Journal of Alloys and Compounds, Jul. 25, 2016, p. 360-p. 367, vol. 674, Elsevier.

Feng Li et al., "Micron-sized monocrystalline LiNi1/3Co1/3Mn1/3O2 as high-volumetric-energy-density cathode for lithium-ion batteries", Journal of Materials Chemistry A, May 29, 2018, p. 12344-p. 12352, vol. 6.

An Office Action mailed by the Korean Patent Office dated Feb. 20, 2020, which corresponds to Korean Patent Application No. 10-2018-0123130 with English Translation.

\* cited by examiner
† cited by third party

POSITIVE ELECTRODE ACTIVE MATERIAL FOR LITHIUM SECONDARY BATTERY AND LITHIUM SECONDARY BATTERY INCLUDING THE SAME

CROSS-REFERENCE TO RELATED APPLICATION

This application claims priority to and the benefit of Korean Patent Application No. 10-2018-0108210, filed on Sep. 11, 2018, and Korean Patent Application No. 10-2018-0123130, filed on Oct. 16, 2018, the disclosures of which are incorporated herein by reference in its entirety.

BACKGROUND

1. Field of the Invention

The present invention relates to a positive electrode active material for a lithium secondary battery and a lithium secondary battery including the same.

2. Discussion of Related Art

Compared to other rechargeable battery systems, a lithium secondary battery has advantages such as a high operating voltage, a light weight, a small size, a non-memory effect, a low self-discharging rate, a long cycle life, a high energy density, etc., and thus is widely used in mobile phones, laptop computers, tablet computers and other mobile terminals.

In addition, in the past several years, in view of environmental protection, electric vehicles have been rapidly developed under the promotion of the government and automobile manufacturers, and a lithium secondary battery is considered as an ideal power source for next generation electric vehicles because of its excellent performance.

As a positive electrode active material for the lithium secondary battery, lithium-based composite oxides are used, and among these, a lithium-cobalt composite oxide ($LiCoO_2$) which has a high working voltage and excellent capacity characteristics is generally used. However, since $LiCoO_2$ is decreased in high-temperature stability due to the instability of a crystal structure according to delithiation and expensive, it has a limitation in being used as a power source in a field requiring a large-capacity battery system such as an electric vehicle.

As a material that replaces $LiCoO_2$, a lithium-manganese composite oxide ($LiMnO_2$ or $LiMn_2O_4$), lithium-iron-phosphate ($LiFePO_4$, etc.) or lithium-nickel composite oxide ($LiNiO_2$, etc.) has been developed, and here, the research and development of lithium-nickel composite oxides is more widely performed since they have a high reversible capacity of approximately 200 mAh/g and thus can realize high-capacity batteries.

However, $LiNiO_2$, compared to $LiCoO_2$, has poor high-temperature stability, when an internal short circuit occurs by pressure provided from outside in charging, the positive electrode active material is decomposed by itself, or a rupture or ignition of a battery may be caused by a side reaction between an electrolyte solution and the interface and surface of a positive electrode active material.

Accordingly, there is a demand for developing a positive electrode active material that can maintain the excellent reversible capacity of $LiNiO_2$ and improve low high-temperature stability.

Meanwhile, a lithium secondary battery may be classified into a can-type secondary battery in which an electrode assembly is housed in a metal can and a pouch-type secondary battery in which an electrode assembly is housed in a pouch formed of a sheet such as an aluminum laminate, according to the shape of the battery case.

A pouch-type secondary battery can realize the same amount of secondary batteries with relatively small volume and mass since it has a light weight and less possibility of leakage of an electrolyte solution. However, when an inner pressure of the battery case rapidly increases, there is a risk of explosion, and thus ensuring stability by controlling gas generation which is the main cause of the inner pressure of the battery case is one of the important tasks.

For example, when overcharge exceeding the limit flows in a secondary battery, the decomposition of an electrolyte solution is caused by a rapid increase in the inner temperature of the battery, thereby generating a gas. However, a gas may be generated by a side reaction between an electrolyte solution and the interface and surface of a positive electrode active material.

SUMMARY

The present invention is directed to providing a positive electrode active material for a lithium secondary battery, which can maintain the excellent reversible capacity of $LiNiO_2$ and improve low high-temperature stability, and a lithium secondary battery including the same.

The present invention is also directed to providing a positive electrode active material for a lithium secondary battery, which can prevent battery swelling caused by gas generation in a secondary battery by reducing the possibility of a side reaction occurring between an electrolyte solution and the interface and surface of a positive electrode active material, and a lithium secondary battery including the same.

The objects of the present invention are not limited to the above-mentioned objects, and other objects and advantages of the present invention which are not mentioned can be understood by the following description and more clearly understood by exemplary embodiments of the present invention. In addition, it will be readily apparent that the objects and advantages of the present invention may be realized by means indicated in the claims and a combination thereof.

According to an aspect of the present invention, a positive electrode active material including a secondary particle including a primary particle, which is a lithium-based composite oxide having lithium ion diffusion pathways in the same direction as the major axis, is provided.

Here, the positive electrode active material has a proportion of secondary particles having a grain boundary density of 0.5 or less is 30% or more among a plurality of secondary particles constituting the positive electrode active material.

Grain boundary density=(the number of boundaries between primary particles in secondary particle/ the number of primary particles constituting secondary particle)

According to another aspect of the present invention, a positive electrode for a lithium secondary battery including the positive electrode active material is provided.

According to still another aspect of the present invention, a lithium secondary battery including the positive electrode is provided.

DETAILED DESCRIPTION

Figure 1:
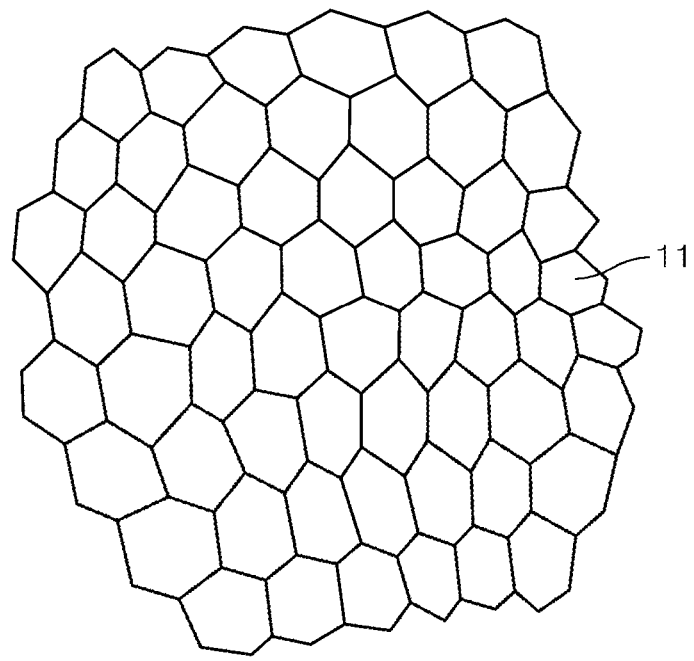
FIG. 1 schematically shows the cross-section of a conventional positive electrode active material.

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

The term "lithium-based composite oxide" used herein refers to an oxide that enables intercalation and deintercalation of lithium ions, and includes lithium and a metal element, and particularly, the lithium-based composite oxide used herein may be a lithium-nickel-based composite oxide including lithium and nickel.

The term "single crystal" used herein refers to a crystal in a state in which a grain boundary is not included in a particle, and the term "primary particle" used herein refers to a particle present alone without forming an aggregate. Accordingly, the "primary particle which is a lithium-based composite oxide having a single crystal structure" refers to a particle in a state in which a grain boundary is not included in a primary particle including a lithium-based composite oxide.

The term "secondary particle" used herein refers to a particle in which the primary particles, which is the above-described lithium-based composite oxide, aggregate. Accordingly, when a secondary particle is formed by aggregating at least two primary particles, there is a grain boundary formed at the interface between two primary particles in the secondary particle.

The term "grain boundary density" used herein refers to the number of grain boundaries formed when at least two primary particles are present in a secondary particle, and as the number of primary particles present in the secondary particle is higher, the grain boundary density increases, and as the number of primary particles present in a secondary particle is lower, the grain boundary density decreases.

The grain boundary density in the present invention may be calculated by the following formula.

Grain boundary density=(the number of boundaries between primary particles in secondary particle/ the number of primary particles constituting secondary particle)

Meanwhile, the second particle of the present invention also includes a particle including single primary particles, and should be understood to mean a primary particle present as a single particle despite post-treatment such as thermal treatment to form a secondary particle by aggregating at least two primary particles. The definition of such a secondary particle will be more exactly explained by the definition of a positive electrode active material which will be described later.

The term "positive electrode active material" used herein is the broad concept including the above-described secondary particle. While a single secondary particle itself may be a positive electrode active material, in the present invention, an assembly of a plurality of secondary particles having different grain boundary densities, as well as an assembly of a plurality of secondary particles having the same grain boundary density, will be defined as a positive electrode active material. The definition of the positive electrode active material in the present invention will be described in further detail below.

Hereinafter, a positive electrode active material for a lithium secondary battery according to the present invention and a lithium secondary battery including the same will be described in further detail.

The specific surface area and grain boundary of a secondary particle included in a positive electrode active material are regions in which a side reaction between the interface and surface of the positive electrode active material and an electrolyte solution occurs, and it is possible to improve the high-temperature stability of the positive electrode active material and reduce gas generation caused by a positive electrode active material by reducing the specific surface area and grain boundary of the secondary particle.

A positive electrode active material for a lithium secondary battery according to an exemplary embodiment of the present invention includes a secondary particle including a primary particle, which is a lithium-based composite oxide having a single crystal structure. At this time, it is possible to reduce the specific surface area and grain boundary of the secondary particle by forming the primary particle constituting the secondary particle in a single crystal. In addition, since the primary particle constituting the secondary particle has lithium ion diffusion pathways in the same direction as the major axis, lithium ions in the secondary particle are concentrated in one direction without being diffused in multiple directions, thereby improving the conductivity of lithium ions.

Figure 2:
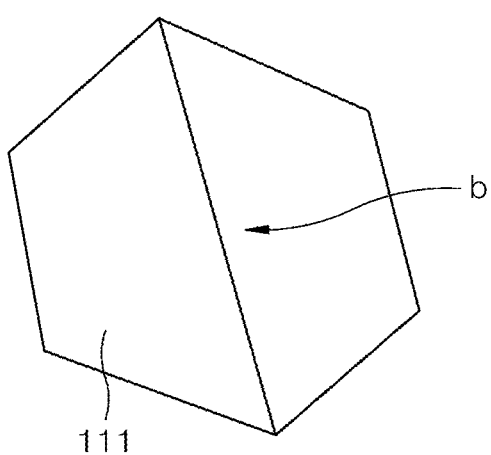
FIGS. 2 to 4 schematically show the cross-section of secondary particles which can be included in a positive electrode active material according to the present invention.
Figure 3:
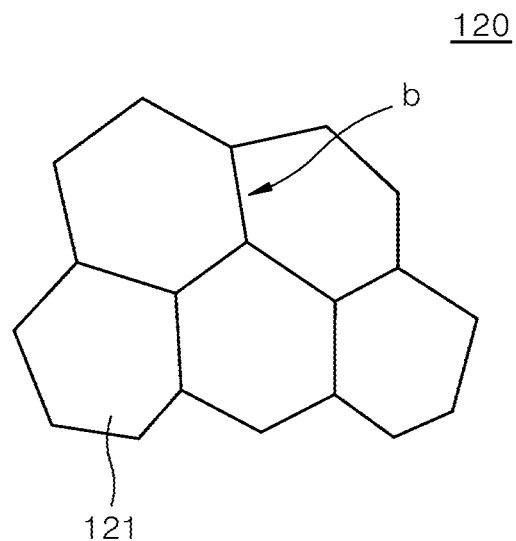
Figure 4:
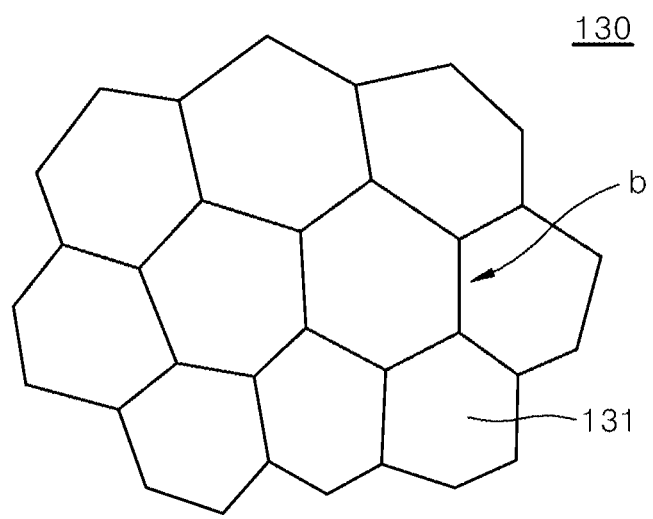

FIG. 1 schematically shows the cross-section of a conventional positive electrode active material, and FIGS. 2 to 4 schematically show the cross-sections of secondary particles which can be included in a positive electrode active material according to various exemplary embodiments of the present invention.

As the secondary particles 110, 120 and 130 included in a positive electrode active material shown in FIGS. 2 to 4 are formed by aggregating 1 to 10 primary particles 111, 121 and 131, compared to a secondary particle 11 formed by aggregating tens to hundreds of primary particles 10 illustrated in FIG. 1, they have relatively small specific surface areas, and thus the surface area in which a side reaction with an electrolyte solution occurs can be reduced. In addition, as the number of primary particles forming a secondary particle decreases, the grain boundary density decreases, so that a side reaction at the grain boundary of the secondary particle may also be reduced.

In addition, according to the present invention, the primary particles constituting a plurality of secondary particles included in a positive electrode active material may be more likely to have lithium ion diffusion pathways in the same direction as the major axis. As such, as the proportion of the lithium ion diffusion pathways in the same direction as the major axis in the secondary particle increases, it is possible to improve lithium ion conductivity and electron conductivity by the positive electrode active material.

Figure 5:
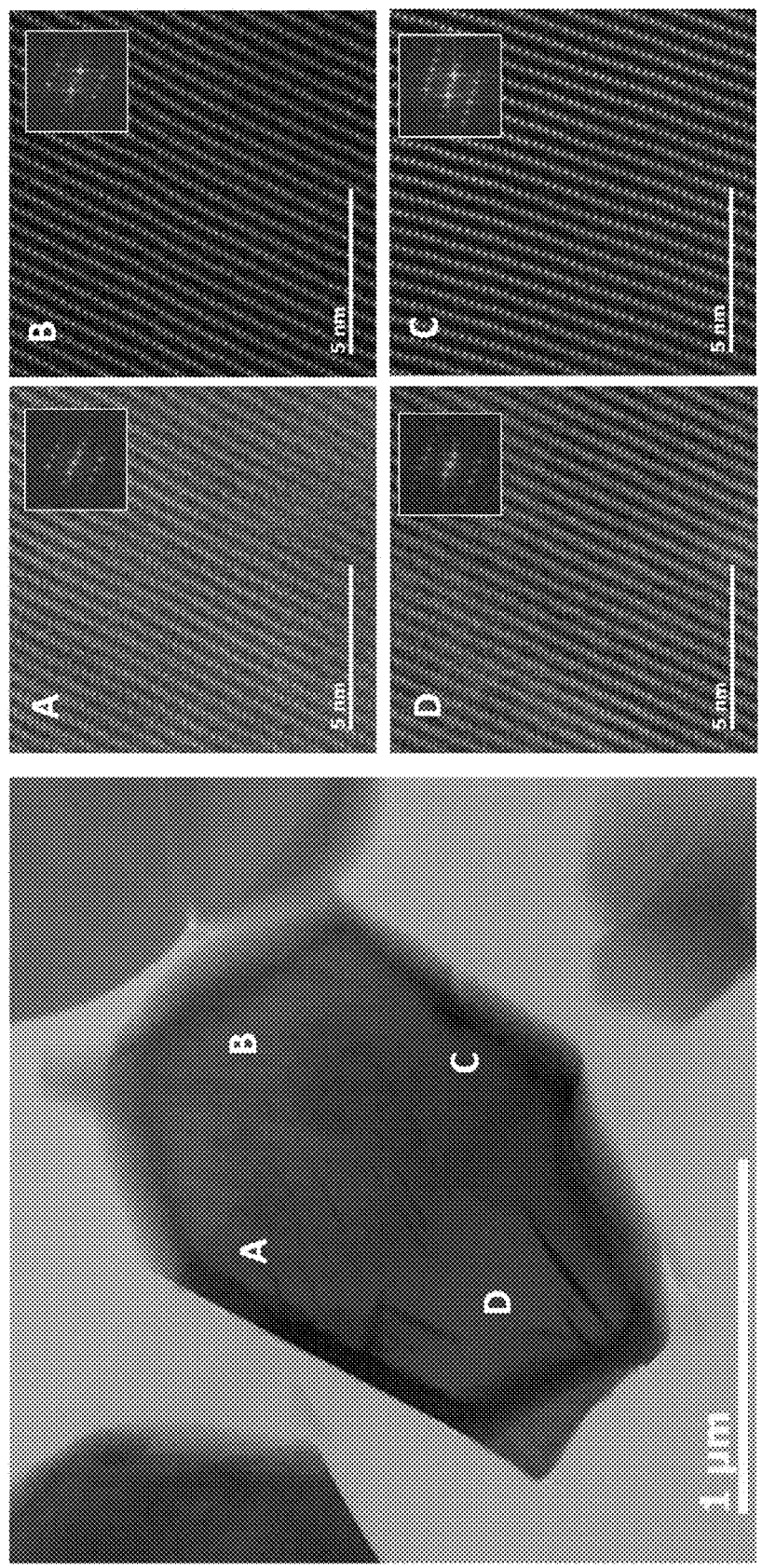
FIGS. 5 and 6 show lithium ion diffusion pathways of a single-crystal positive electrode active material (secondary particle)
Figure 6:
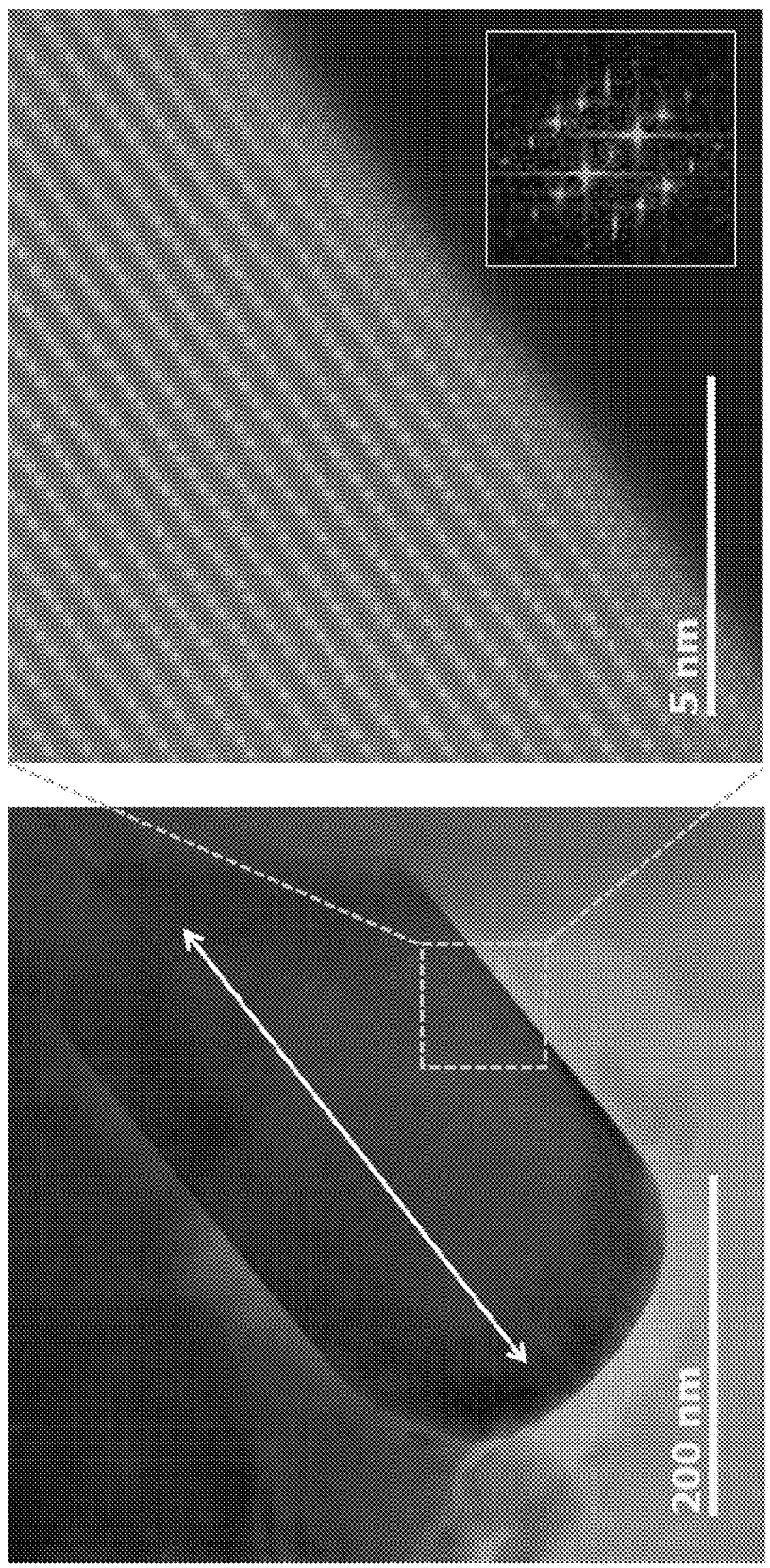
Figure 7:
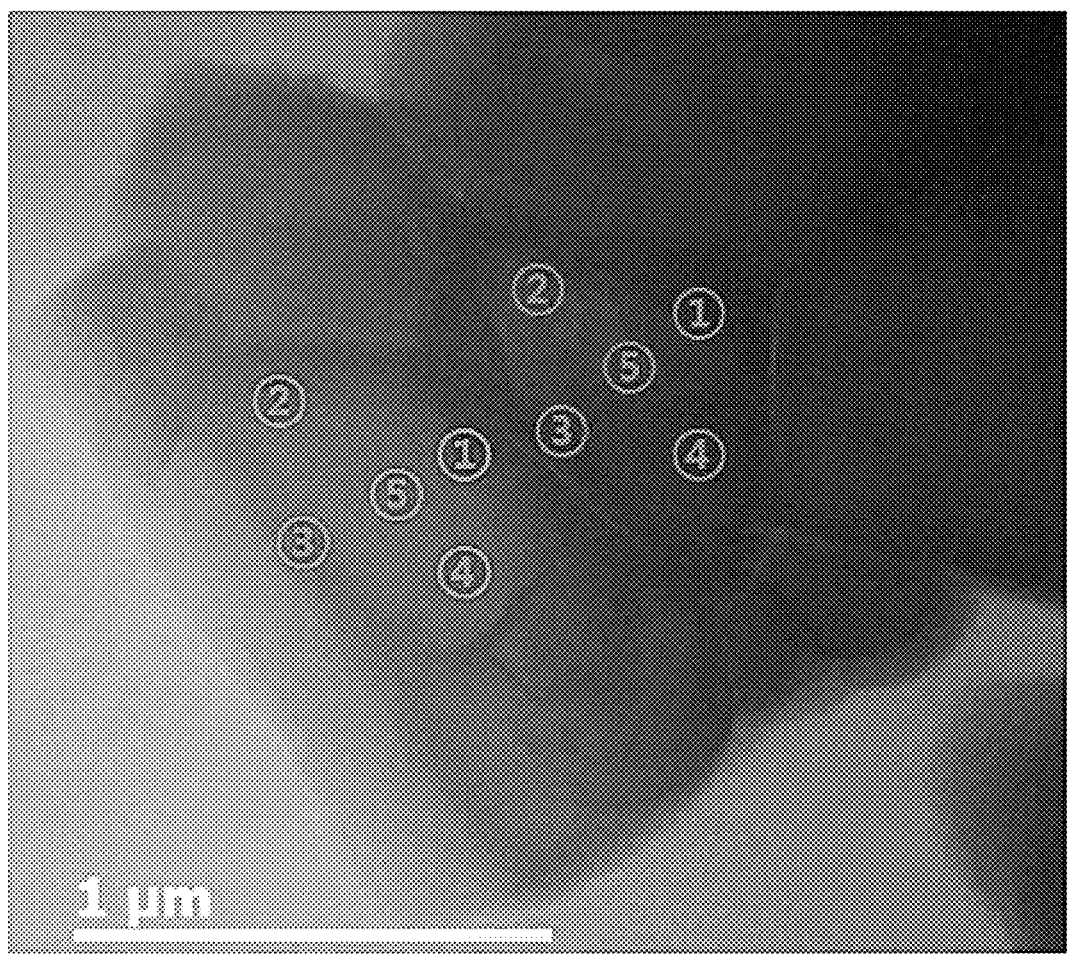
FIGS. 7, 8A and 8B show lithium ion diffusion pathways of a positive electrode active material (secondary particle) formed by aggregating a plurality of primary particles.
Figure 8A:
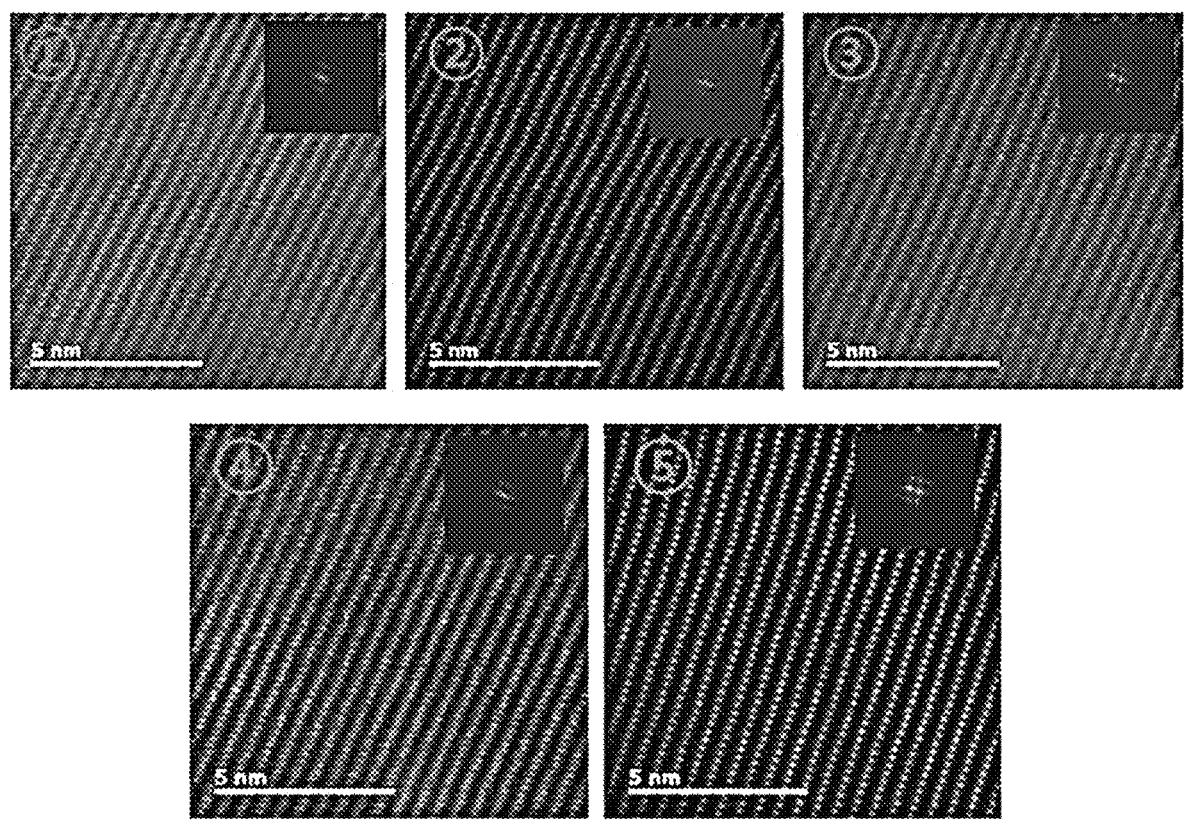
Figure 8B:
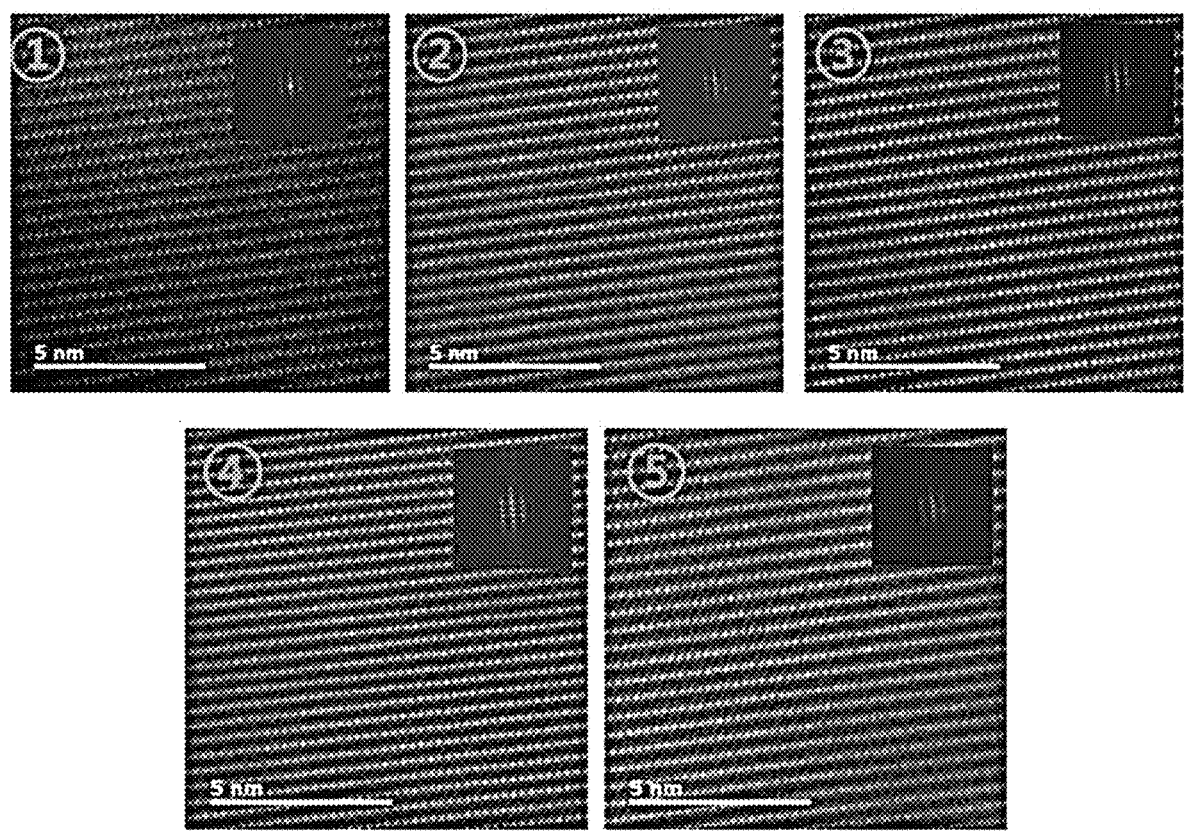

FIGS. 5 and 6 show lithium ion diffusion pathways of a single-crystal positive electrode active material (secondary particle), and FIGS. 7, 8A and 8B show lithium ion diffusion pathways of a positive electrode active material (secondary particle) formed by aggregating a plurality of primary particles.

Referring to FIGS. 5 and 6, it can be confirmed that all of lithium ion diffusion pathways at arbitrary spots (A to D) in the positive electrode active material (secondary particle) are formed in the same direction as the major axis. That is, since lithium ions in the positive electrode active material (secondary particle) are concentrated and diffused in one direction without being diffused in multiple directions, it is possible to improve the conductivity of lithium ions by the positive electrode active material (secondary particle).

However, referring to FIGS. 7, 8A and 8B, it can be confirmed that the positive electrode active material (secondary particle) is formed by aggregating a plurality of primary particles, and lithium ion diffusion pathways at arbitrary spots (①  to ⑤ ) in the left primary particle do not match with lithium ion diffusion pathways at arbitrary spots (①  to ⑤ ) in the right primary particle. In this case, compared to the positive electrode active materials illustrated in FIGS. 5 and 6, they are decreased in diffusion ability of lithium ions, such that lithium ion conductivity caused by the positive electrode active material (secondary particle) is relatively lower.

Accordingly, the proportion of primary particles having lithium ion diffusion pathways in the same direction as the major axis in a secondary particle included in a positive electrode active material according to the present invention is preferably 30% or more, and more preferably 70% or more. As described above, as the ratio of the primary particles having lithium ion diffusion pathways in the same direction as the major axis of the secondary particle increases, it is possible to improve the conductivity of lithium ions in the positive electrode active material.

In one exemplary embodiment, the positive electrode active material according to the present invention may be an assembly of secondary particles having different grain boundary densities.

In the present invention, the grain boundary density may be calculated by the following equation.

Grain boundary density=(the number of boundaries between primary particles in secondary particle/ the number of primary particles constituting secondary particle)

Secondary particles having different grain boundary densities may have different physical and chemical characteristics. The physical characteristics which may be dependent on a grain boundary density include a difference in specific surface area of the secondary particle before/after pressing, and the chemical characteristic may be, for example, a difference in proportion of side reactions between the surface and/or interface of secondary particles and an electrolyte solution.

For example, as the secondary particle 10 shown in FIG. 1 is formed by aggregating a higher number of primary particles 11 compared to the secondary particles 110, 120 and 130 shown in FIGS. 2 to 4, the grain boundary density formed by the primary particles 11 is higher than that of the secondary particles 110, 120 and 130 shown in FIGS. 2 to 4. In addition, it can be confirmed that the number of grain boundaries b formed by the primary particles 111, 121 or 131 in the secondary particles 110, 120 or 130 shown in FIGS. 2 to 4, respectively, is considerably smaller than that in the secondary particle 10 shown in FIG. 1. Generally, the grain boundary formed by the primary particles in the secondary particle is a region in which a side reaction with an electrolyte solution may occur, and the smaller the grain boundary density in the secondary particle or the smaller the number of grain boundaries, the lower possibility of a side reaction with an electrolyte solution.

Specifically, in the positive electrode active material according to the present invention, the proportion of secondary particles having a grain boundary density of 0.5 or less is 30% or more, preferably 50% or more, and more preferably 70% or more among a plurality of secondary particles constituting the positive electrode active material.

For example, when a secondary particle consists of a single primary particle having a single crystal structure, the grain boundary density is 0 (number of grain boundary between primary particles in secondary particle=0/number of primary particles constituting secondary particle=1), and when a secondary particle consists of two primary particles having a single crystal structure, the grain boundary density is 0.5. That is, as the number of grain boundaries between primary particles in a secondary particle is smaller, a relatively smaller grain boundary density may be exhibited. Here, when the number of primary particles constituting a secondary particle increases, the number of grain boundaries between primary particles in a secondary particle also increases, and therefore, in order to have a grain boundary density of 0.5 or less, the secondary particle should consist of one or two primary particles having a single crystal structure.

Here, the average particle diameter of the lithium-based composite oxide primary particle having a single crystal structure may be 0.01 to 50 μm, and preferably, 0.01 to 20 μm. Since the average particle diameter of the lithium-based composite oxide primary particle having a single crystal structure ranges from 0.01 to 20 μm, the optimal density of a positive electrode prepared using the positive electrode active material may be realized.

In addition, the average particle diameter of the secondary particle may vary according to the number of aggregated primary particles, and may be 0.01 to 50 μm.

More specifically, the positive electrode active material may include a secondary particle including one or two primary particles (hereinafter, for convenience, referred to as "first aggregate"), a secondary particle including 3 to 6 primary particles (hereinafter, for convenience, referred to as "second aggregate"), or a secondary particle including 7 to 10 primary particles (hereinafter, for convenience, referred to as "third aggregate").

The first aggregate 110 shown in FIG. 2 includes one or two primary particles 111 forming a secondary particle, and since the number of primary particles forming a secondary particle is smaller than that in a second aggregate or a third aggregate, the first aggregate has a relatively small specific surface area, and thus it is possible to reduce a region in which a side reaction with an electrolyte solution occurs.

In addition, the number of grain boundaries b formed by the primary particles 111 in the first aggregate 110 will be 1 or less. Accordingly, compared to the case of having two or more grain boundaries, the probability of a side reaction with an electrolyte solution at the grain boundary may be reduced.

In addition, when the secondary particle consists of one primary particle, lithium ion diffusion pathways at arbitrary sites in the secondary particle may be the same as each other, and although a secondary particle consists of two primary particles, compared to when a secondary particle consists of three or more primary particles, it is more likely that the lithium ion diffusion pathways at arbitrary spots will be in the same direction as the major axis.

That is, the lower the number of primary particles constituting a secondary particle, the higher probability that the secondary particle has lithium ion diffusion pathways in the same direction as the major axis, and therefore, it is possible to improve lithium ion conductivity and electron conductivity by the positive electrode active material.

Such a first aggregate preferably accounts for 30% or more among the assemblies of secondary particles constituting the positive electrode active material. Here, the proportion (%) of the first aggregate among the assemblies of secondary particles means the proportion (%) of the number of the first aggregate of the total number of secondary particles constituting the assembly.

When the proportion of the first aggregate among the assemblies of secondary particles constituting the positive electrode active material is less than 30%, since the proportion of the first aggregate among the assemblies is lower, the average specific surface area and grain boundary density of secondary particles constituting the positive electrode active material is higher. Accordingly, the higher possibility of a side reaction between the positive electrode active material and an electrolyte solution may act as a cause of reducing the high-temperature stability and storability of the positive electrode active material.

Meanwhile when a plasticizing temperature increases, it is possible to increase the proportion of the first aggregate among the assemblies of secondary particles constituting the positive electrode active material. However, when a plasticizing temperature is excessively high, the possibility of deteriorating the positive electrode active material may rather increase.

In addition, the second aggregate 120 shown in FIG. 3 includes 3 to 6 primary particles 121 forming a secondary particle, and may be present at 70% or less, and preferably 20% or more and 70% or less among the assemblies of secondary particles constituting the positive electrode active material.

In addition, the third aggregate 130 shown in FIG. 4 includes 7 to 10 primary particles 131 forming a secondary particle, and is preferably present at 10% or less among the assemblies of secondary particles constituting the positive electrode active material.

Here, the positive electrode active material may also include a secondary particle formed by aggregating a larger number of primary particles than the third aggregate (secondary particle including 7 to 10 primary particles constituting the secondary particle). In this case, the proportion of the third aggregate among the assemblies of secondary particles and the secondary particles formed by aggregating a larger number of primary particles than the third aggregate is preferably 10% or less.

When the proportion of the first aggregate is 70%, and the ratio of the second aggregate is decreased to less than 20%, since the ratio of the second aggregate to the third aggregate is lower, the average specific surface area and grain boundary density of the secondary particle constituting the positive electrode active material increase, which may act as a cause of reducing the high-temperature stability and storability of the positive electrode active material.

Meanwhile, when the proportion of the second aggregate among the assemblies of the secondary particles constituting the positive electrode active material is more than 30%, the ratio of the second aggregate to the first aggregate is relatively higher, and thus the average specific surface area and grain boundary density of a secondary particle constituting the positive electrode active material may increase.

As described above, the positive electrode active material according to the present invention may include a first aggregate, a second aggregate and a third aggregate, and by adjusting the proportions of the first aggregate, the second aggregate and the third aggregate, the average ratio of primary particles having lithium ion diffusion pathways in the same direction as the major axis in a secondary particle constituting the positive electrode active material may be 50% or more.

A lithium-based composite oxide forming the positive electrode active material according to the present invention may be represented by Formula 1 below.

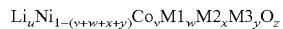

Here, M1 is Mn or Al, and M2 and M3 are each independently a metal selected from Al, Ba, B, Ce, Cr, Mg, Mn, Mo, Na, K, P, Sr, Ti, W and Zr, and different from each other.
(0.95≤u≤1.05, 0≤v≤0.20, 0≤w≤0.20, 0≤x≤0.05, 0≤y≤0.05, 1.50≤z≤2.1)

As described above, the specific surface area and grain boundary of a secondary particle included in the positive electrode active material according to the present invention are regions in which side reactions between the interface and surface of the positive electrode active material and an electrolyte solution occur, and according to the present invention, the specific surface area and grain boundary of a secondary particle included in the positive electrode active material are reduced, thereby improving the high-temperature stability of the positive electrode active material and reducing gas generation caused by the positive electrode active material.

Particularly, the positive electrode active material according to the present invention includes a secondary particle including 1 to 10 primary particles having lithium ion diffusion pathways in the same direction as the major axis, and the positive electrode active material may be the assembly of a plurality of secondary particles having different grain boundary densities.

Here, the assembly of secondary particles includes a first aggregate including 1 or 2 primary particles, a second aggregate including 3 to 6 primary particles, and a third aggregate including 7 to 10 primary particles, and the proportions of the first aggregate, the second aggregate and the third aggregate are adjusted in consideration of the average specific surface area, grain boundary and lithium ion diffusion pathways of the positive electrode active material, thereby improving the stability and electrical characteristics of the positive electrode active material.

For example, in the positive electrode active materials according to various exemplary embodiments of the present invention, a lattice structure may be stabilized by balancing grain boundary densities according to the proportions of the first aggregate, the second aggregate and the third aggregate. Particularly, the thermal stability of a positive electrode active material may be improved by preventing the collapse of the lattice structure of a positive electrode active material under a relatively high temperature condition.

The positive electrode formed of the assembly of secondary particles may have a BET specific surface area of 0.1 to 1.5 m²/g.

As the proportion of the second aggregate among the assemblies of the secondary particles included in the positive electrode active material exceeds 30%, when the ratio of the first aggregate is less than 30%, the ratio of the first aggregate among the assemblies decreases, and thus the average specific surface area of a secondary particle included in the positive electrode active material increases. Here, the BET specific surface area may exceed 1.5 m²/g.

In addition, when the proportion of the third aggregate included in the positive electrode active material exceeds 10%, the average specific surface area of a secondary particle included in the positive electrode active material increases. Here, the BET specific surface area may exceed 1.5 m²/g.

The d(10) variation of a particle size distribution before/after 2.5 t (ton) pressing of a secondary particle included in the positive electrode active material according to the present invention may be 5% or less, the d(10) variation of a particle size distribution before/after 4.5 t pressing may be 15% or less, and the d(10) variation of a particle size distribution before/after 6.0 t pressing may be 30% or less.

In addition, the d(50) variation of a particle size distribution before/after 2.5 t (ton) pressing of a secondary particle included in the positive electrode active material according to the present invention may be 3% or less, the d(50) variation of a particle size distribution before/after 4.5 t pressing may be 20% or less, and the d(50) variation of a particle size distribution before/after 6.0 t pressing may be 30% or less.

In addition, the d(90) variation of a particle size distribution before/after 2.5 t (ton) pressing of a secondary particle included in the positive electrode active material according to the present invention may be 5% or less, the d(90) variation of a particle size distribution before/after 4.5 t pressing may be 15% or less, and the d(90) variation of a particle size distribution before/after 6.0 t pressing may be 20% or less.

To prepare a positive electrode for a lithium secondary battery using a positive electrode active material, a slurry including a positive electrode active material is applied onto a positive electrode current collector, dried and rolled (pressed). Particularly, it is possible to prepare a positive electrode with a high energy density through rolling under a condition of high pressure. Here, as the rolling density increases, in the case of a positive electrode active material having a smaller particle strength, particles are destroyed, and thus desired electrical characteristics cannot be expected. However, in the case of a positive electrode active material having a large particle strength, even under a high pressure rolling condition, performance may be maintained without destruction of particles.

Particularly, when the particle destruction occurs under a rolling condition, the proportion of secondary particles included in a relatively small particle distribution range increases, and in the present invention, particle strengths are represented by d(10), d(50) and d(90) variations of the particle size distribution before/after pressing.

In the positive electrode active material according to the present invention, the variation of the particle size distribution before/after 4.5 t pressing is only 13%, and the variation of the particle size distribution before/after 6 t pressing is only 26%. Accordingly, the positive electrode active material according to the present invention can minimize particle destruction even under a high pressure condition while maintaining performance.

In addition, the positive electrode active materials according to various exemplary embodiments of the present invention may include a coating layer covering at least a part of the surface(s) of the primary particle (e.g., the interface between the primary particles) and/or a secondary particle formed by aggregating the primary particles.

For example, the coating layer may be present to cover at least a part of the exposed surface of the primary particle. Particularly, the coating layer may be present to cover at least a part of the exposed surface of the primary particle present at the outermost part of the secondary particle.

Accordingly, the coating layer may be present as a layer continuously or discontinuously coating the surface of the primary particle and/or the secondary particle formed by aggregating the primary particles. When the coating layer is discontinuously present, it may be present in an island form.

The coating layer present as described above may contribute to improvement in physical and electrochemical characteristics of the positive electrode active material.

In addition, the coating layer may be present in the form of a solid solution without forming a boundary between the primary particle and/or the secondary particle formed by aggregating the primary particles.

The coating layer may include at least one oxide represented by Formula 2 below. That is, the coating layer may be defined as a region in which the oxide represented by Formula 2 below is present.

 [Formula 2]

(Here,

A is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, 0≤a≤6, 0≤b≤4, and 2≤c≤8)

In addition, the coating layer may be present in a form in which different types of oxides are simultaneously present in one layer, or different types of oxides represented by Formula 2 are present in different layers.

The oxide represented by Formula 2 may be physically and/or chemically connected with the primary particle represented by Formula 1. In addition, the oxide may form a solid solution with the primary particle represented by Formula 1.

The positive electrode active material according to this exemplary embodiment includes a coating layer covering at least a part of the surface(s) of the primary particle (e.g., the interface between the primary particles) and/or a secondary particle formed by aggregating the primary particles. In addition, when such a positive electrode active material is used in a lithium secondary battery, the high-temperature storage stability and lifespan characteristics of the positive electrode active material may be improved. In addition, the oxide may reduce residual lithium in the positive electrode active material and simultaneously serve as a lithium ion migration pathway, and thus may have an effect on an improvement in the efficiency characteristics of a lithium secondary battery.

In addition, in some cases, the oxide may be present on at least a part of the interface between the primary particles and the surface of the secondary particle, and also in an inner pore formed in the secondary particle.

The oxide may be an oxide formed by complexing lithium and an element represented by A, or an oxide of A. While the oxide may be, for example, $Li_aW_bO_c$, $Li_aZr_bO_c$, $Li_aTi_bO_c$, $Li_aNi_bO_c$, $Li_aBa_bO_c$, $Li_aB_bO_c$, $W_bO_c$, $Zr_bO_c$, $Ti_bO_c$ or $Ba_bO_c$, the above-described examples are merely provided for convenience of understanding and the oxide defined in the present invention is not limited to the examples described above.

In another exemplary embodiment, the oxide may be an oxide prepared by complexing lithium and at least two types of elements represented by A, or may further include an oxide prepared by complexing lithium and at least two types of elements represented by A. The oxide prepared by complexing lithium and at least two types of elements represented by A may be, for example, $Li_a(W/Ti)_bO_c$, $Li_a(W/Zr)_bO_c$, $Li_a(W/Ti/Zr)_bO_c$, $Li_a(W/Ti/Ba)_bO_c$, or $Li_a(W/Ti/B)_bO_c$, but the present invention is not necessarily limited thereto.

Here, the oxide may exhibit a concentration gradient that decreases from the surface to the center of the secondary particle. Accordingly, the concentration of the oxide may decrease from the outermost surface to the center of the secondary particle.

As described above, as the oxide has a concentration gradient which decreases from the surface toward the center of the secondary particle, residual lithium present at the surface of the positive electrode active material is effectively reduced, thereby preventing a side reaction by the unreacted residual lithium beforehand. In addition, a decrease in crystallinity in the inside of the surface of the positive electrode active material by the oxide may be prevented. In addition, the collapse of the entire structure of the positive electrode active material during an electrochemical reaction may be prevented by the oxide.

Additionally, the coating layer may include a first oxide layer including at least one oxide represented by Formula 2, and a second oxide layer including at least one oxide represented by Formula 2, which is different from an oxide included in the first oxide layer.

For example, the first oxide layer may be present to cover at least a part of the exposed surface of the primary particle present at the outermost part of the secondary particle, and the second oxide layer may be present to cover at least a part of the exposed surface of the primary particle which is not covered by the first oxide layer and the surface of the first oxide layer.

According to another exemplary embodiment of the present invention, a positive electrode including the above-described positive electrode active material and a secondary battery are provided.

The positive electrode includes a positive electrode current collector, and a positive electrode active material layer disposed on the positive electrode current collector, and the positive electrode active material according to an exemplary embodiment of the present invention is present in the positive electrode active material layer.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the positive electrode current collector, thereby increasing the adhesive strength of a positive electrode active material. For example, the positive electrode current collector may be used in various forms such as a film, a sheet, a foil, a net, a porous body, foam, a non-woven fabric, etc.

In addition, the positive electrode active material layer may be a layer including a conductive material and a binder as well as the above-described positive electrode active material.

Here, the conductive material is used to impart conductivity to an electrode, and is not particularly limited as long as it has electron conductivity without causing a chemical change in a battery. A non-limiting example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber including copper, nickel, aluminum, or silver; a conductive whisker including zinc oxide or potassium titanate; a conductive metal oxide such as titanium oxide; or a conductive polymer such as a polyphenylene derivative. The conductive material may be included at 1 to 30 wt % with respect to the total weight of the positive electrode active material layer.

In addition, the binder serves to improve attachment between particles of the positive electrode active material and the adhesive strength between the positive electrode active material and a current collector. Non-limiting examples of the binder may include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof. The binder may be included at 1 to 30 wt % with respect to the total weight of the positive electrode active material layer.

The positive electrode according to an exemplary embodiment of the present invention may be prepared by a conventional method of preparing a positive electrode for a lithium secondary battery, except that the above-described positive electrode active material is used. For example, a positive electrode may be prepared by applying a slurry for forming a positive electrode active material layer including a positive electrode active material, and selectively, a binder and a conductive material, drying and rolling the resulting product. According to another example, the positive electrode may be prepared by casting a slurry for forming a positive electrode active material layer on a separate support, and laminating a film obtained by delamination from the support on a positive electrode current collector.

According to still another aspect of the present invention, an electrochemical device including the above-described positive electrode may be provided. The electrochemical device may be, specifically, a battery, a capacitor, and more specifically, a lithium secondary battery.

The lithium secondary battery includes a positive electrode, a negative electrode disposed opposite to the positive electrode, a separator interposed between the positive electrode and the negative electrode, and an electrolyte (electrolyte solution). In addition, the lithium secondary battery may include a battery container (case) accommodating an electrode assembly including a positive electrode, a negative electrode and a separator, and a sealing member that seals the battery container.

Here, according to the shape of a battery container (case), a lithium secondary battery may be classified as a can-type lithium secondary battery in which an electrode assembly is built in a metal can and a pouch-type lithium secondary battery in which an electrode assembly is built in a pouch formed of a sheet such as an aluminum laminate.

Particularly, since a pouch-type lithium secondary battery using a positive electrode including one of the positive electrode active materials according to various exemplary embodiments of the present invention has less possibility of a side reaction between the positive electrode active material and an electrolyte solution, it is possible to improve stability during storage and/or operation, and reduce gas generation.

Accordingly, the lithium secondary batteries using positive electrodes using the positive electrode active materials according to various exemplary embodiments of the present invention may have a volume increase of 0.3 cm$^3$ or less, for example, during storage for 14 days at 60° C. after being charged at 0.2 C until 4.25V, thereby ensuring reliability and stability.

Hereinafter, the present invention will be described in further detail with reference to examples. However, these examples are merely provided to explain the present invention, and it will not be interpreted that the scope of the present invention is limited by the examples below.

Preparation of Positive Electrode Active Material

Example 1

A positive electrode active material for a lithium secondary battery was prepared by measuring and mixing a NiCo(OH)$_2$ precursor prepared by co-precipitation, Li$_2$CO$_3$ and LiOH (Li/M ratio=1.05±0.05) as lithium compounds and Al to have a composition LiNi$_{0.9}$Co$_{0.078}$Al$_{0.022}$, and performing first thermal treatment at 800±50° C. The positive electrode active material for a lithium secondary battery prepared as above was washed by adding distilled water and maintaining a temperature. After dehydration, the positive electrode active material was dried at 150° C. in a vacuum atmosphere. Subsequently, the dried positive electrode active material was subjected to second thermal treatment at 700±50° C.

Example 2

A positive electrode active material was prepared by the same method as described in Example 1, except that a first thermal treatment temperature was 850±50° C.

Example 3

A positive electrode active material was prepared by the same method as described in Example 1, except that the Ba-containing precursor (Ba(OH)$_2$) was further mixed during the co-precipitation of Example 1 such that a Ba content in the finally-produced positive electrode active material became 0.3 mol %.

Example 4

A positive electrode active material was prepared by the same method as described in Example 1, except that a Zr-containing precursor (Zr(OH)$_4$) was further mixed in the co-precipitation of Example 1, such that the Zr content of the finally-produced positive electrode active material became 0.1 mol %.

Example 5

The positive electrode active material obtained in Example 1 was mixed with a Co-containing raw material (Co$_3$O$_4$) using a mixer. The Co-containing raw material (Co$_3$O$_4$) was mixed to be 3.0 wt % with respect to the total weight of the positive electrode active material. Subsequently, the resulting mixture was heated at 2° C. per minute while maintaining an O2 atmosphere in the same plasticizing furnace, maintained at a thermal treatment temperature of 700° C. for 8 hours, and then naturally cooled.

Example 6

A positive electrode active material was prepared by the same method as described in Example 5, except that a W-containing raw material (WO$_3$) was used instead of a Co-containing raw material (Co$_3$O$_4$). The W-containing raw material (WO$_3$) was mixed to be 0.3 wt % with respect to the total weight of the positive electrode active material.

Example 7

A positive electrode active material was prepared by the same method as described in Example 5, except that a Ti-containing raw material (TiO$_2$) was used instead of a Co-containing raw material (Co$_3$O$_4$). The Ti-containing raw material (TiO$_2$) was mixed to be 0.1 wt % with respect to the total weight of the positive electrode active material.

Example 8

A positive electrode active material was prepared by the same method as described in Example 5, except that a Zr-containing raw material (ZrO$_2$) was used instead of a Co-containing raw material (Co$_3$O$_4$). The Zr-containing raw material (ZrO$_2$) was mixed to be 0.1 wt % with respect to the total weight of the positive electrode active material.

Example 9

A positive electrode active material was prepared by the same method as described in Example 5, except that an Al-containing raw material ($Al_2O_3$) was used instead of a Co-containing raw material ($Co_3O_4$). The Al-containing raw material ($Al_2O_3$) was mixed to be 0.5 wt % with respect to the total weight of the positive electrode active material.

Comparative Example 1

A positive electrode active material was prepared by the same method as described in Example 1, except that a first thermal treatment temperature was 700±50° C.

Comparative Example 2

A positive electrode active material was prepared by the same method as described in Comparative Example 1, except that a Ba-containing precursor ($Ba(OH)_2$) was further mixed in co-precipitation of Comparative Example 1 such that the Ba content of the finally produced positive electrode active material became 0.3 mol %.

Comparative Example 3

A positive electrode active material was prepared by the same method as described in Comparative Example 1, except that a Zr-containing precursor ($Zr(OH)_4$) was further mixed in co-precipitation of Comparative Example 1 such that the Zr content of the finally produced positive electrode active material became 0.1 mol %.

Comparative Example 4

The positive electrode active material obtained in Comparative Example 1 was mixed with a Co-containing raw material ($Co_3O_4$) using a mixer. The Co-containing raw material ($Co_3O_4$) was mixed to be 3.0 wt % with respect to the total weight of the positive electrode active material. Subsequently, the resulting mixture was heated at 2° C. per minute while maintaining an O2 atmosphere in the same plasticizing furnace, maintained at a thermal treatment temperature of 700° C. for 8 hours, and then naturally cooled.

Comparative Example 5

A positive electrode active material was prepared by the same method as described in Comparative Example 4, except that a W-containing raw material ($WO_3$) was used instead of a Co-containing raw material ($Co_3O_4$). The W-containing raw material ($WO_3$) was mixed to be 0.3 wt % with respect to the total weight of the positive electrode active material.

Comparative Example 6

A positive electrode active material was prepared by the same method as described in Comparative Example 4, except that a Ti-containing raw material ($TiO_2$) was used instead of a Co-containing raw material ($Co_3O_4$). The Ti-containing raw material ($TiO_2$) was mixed to be 0.1 wt % with respect to the total weight of the positive electrode active material.

Comparative Example 7

A positive electrode active material was prepared by the same method as described in Comparative Example 4, except that a Zr-containing raw material ($ZrO_2$) was used instead of a Co-containing raw material ($Co_3O_4$). The Zr-containing raw material ($ZrO_2$) was mixed to be 0.1 wt % with respect to the total weight of the positive electrode active material.

Comparative Example 8

A positive electrode active material was prepared by the same method as described in Comparative Example 4, except that an Al-containing raw material ($Al_2O_3$) was used instead of a Co-containing raw material ($Co_3O_4$). The Al-containing raw material ($Al_2O_3$) was mixed to be 0.5 wt % with respect to the total weight of the positive electrode active material.

Experimental Example 1. Structure of Positive Electrode Active Material

Figure 9:
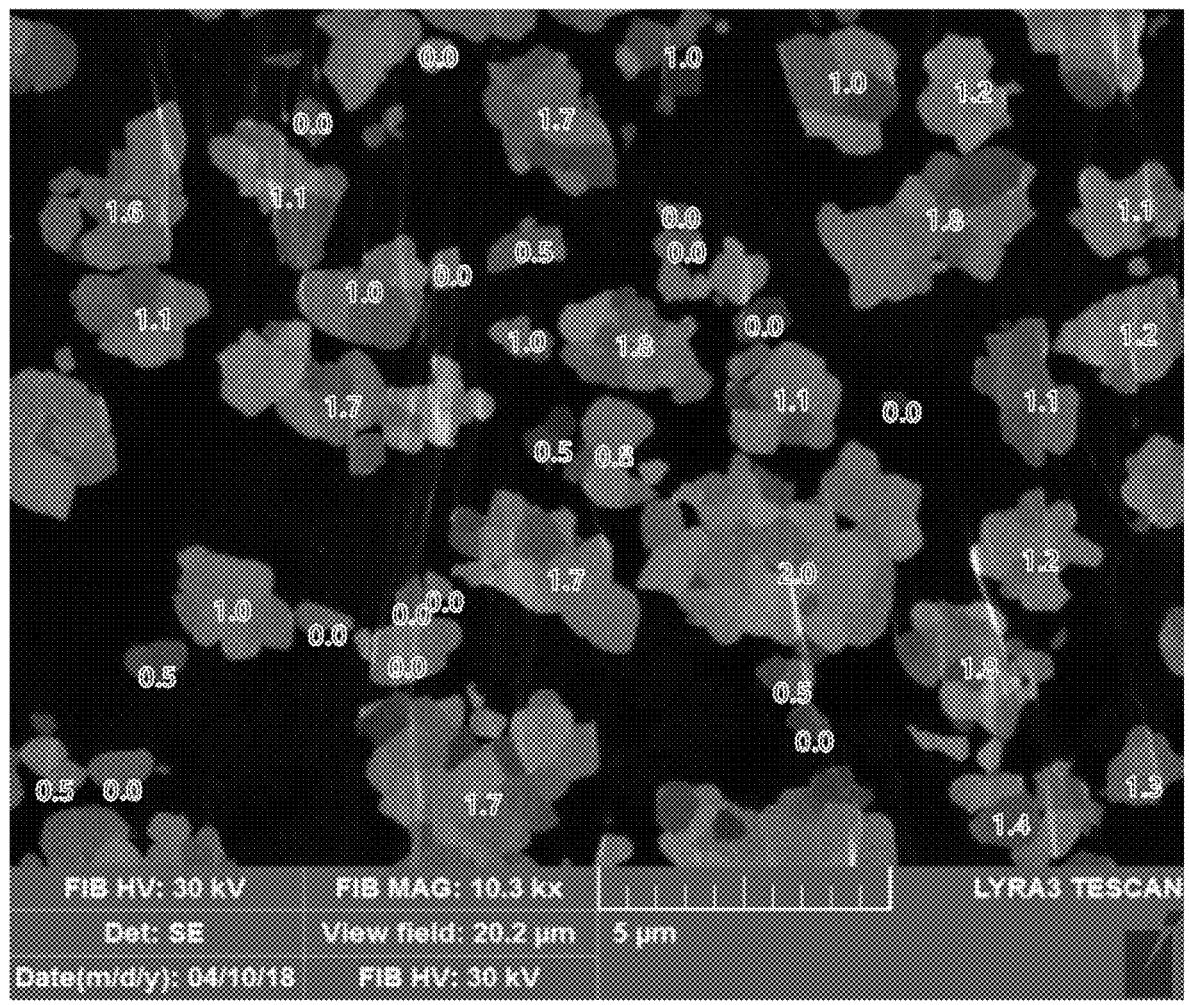
FIG. 9 is a cross-sectional SEM image of the positive electrode active material prepared according to Example 1, showing the grain boundary density of a secondary particle included in the positive electrode active material.
Figure 10:
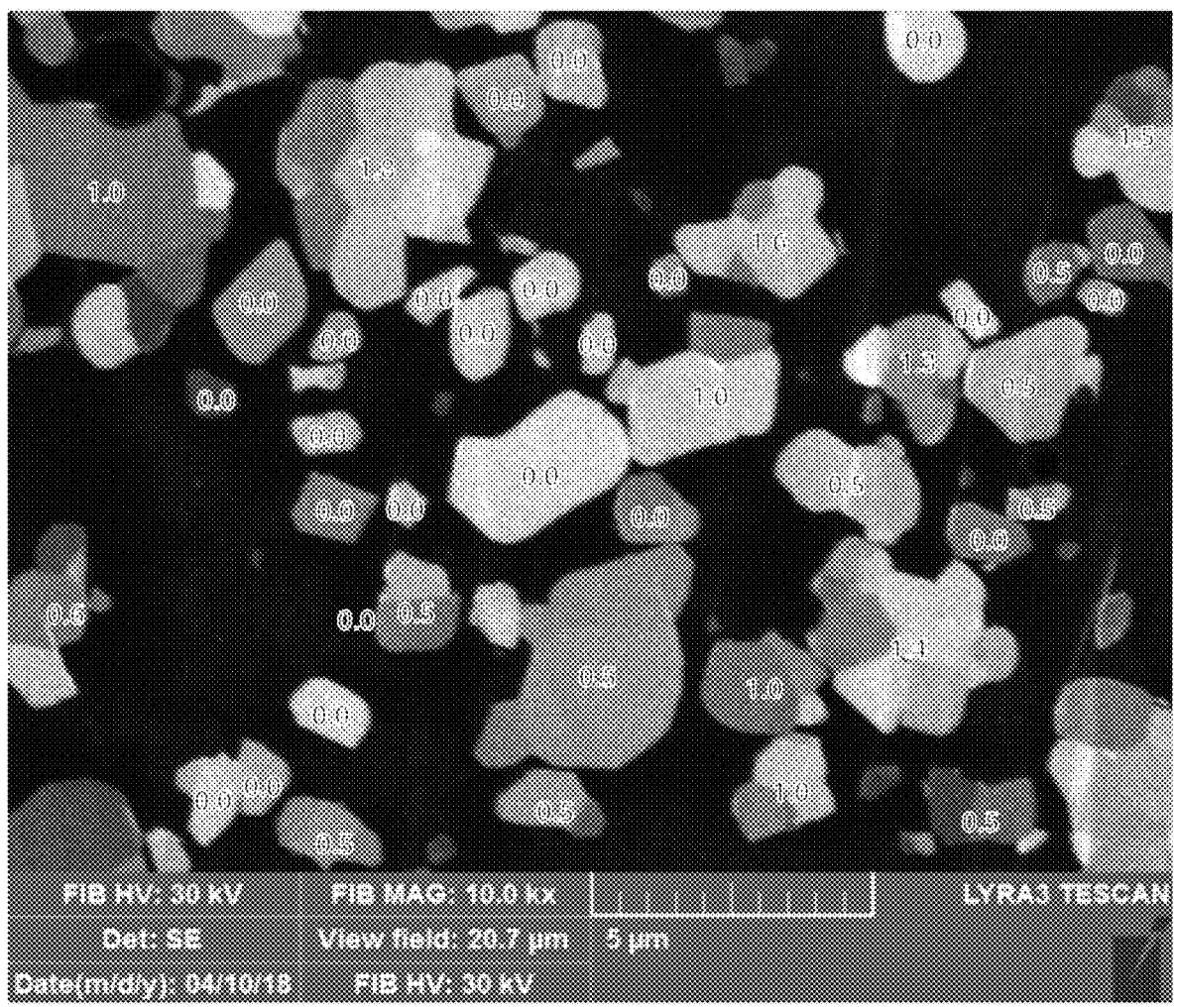
FIG. 10 is a cross-sectional SEM image of the positive electrode active material prepared according to Example 2, showing the grain boundary density of a secondary particle included in the positive electrode active material.
Figure 11:
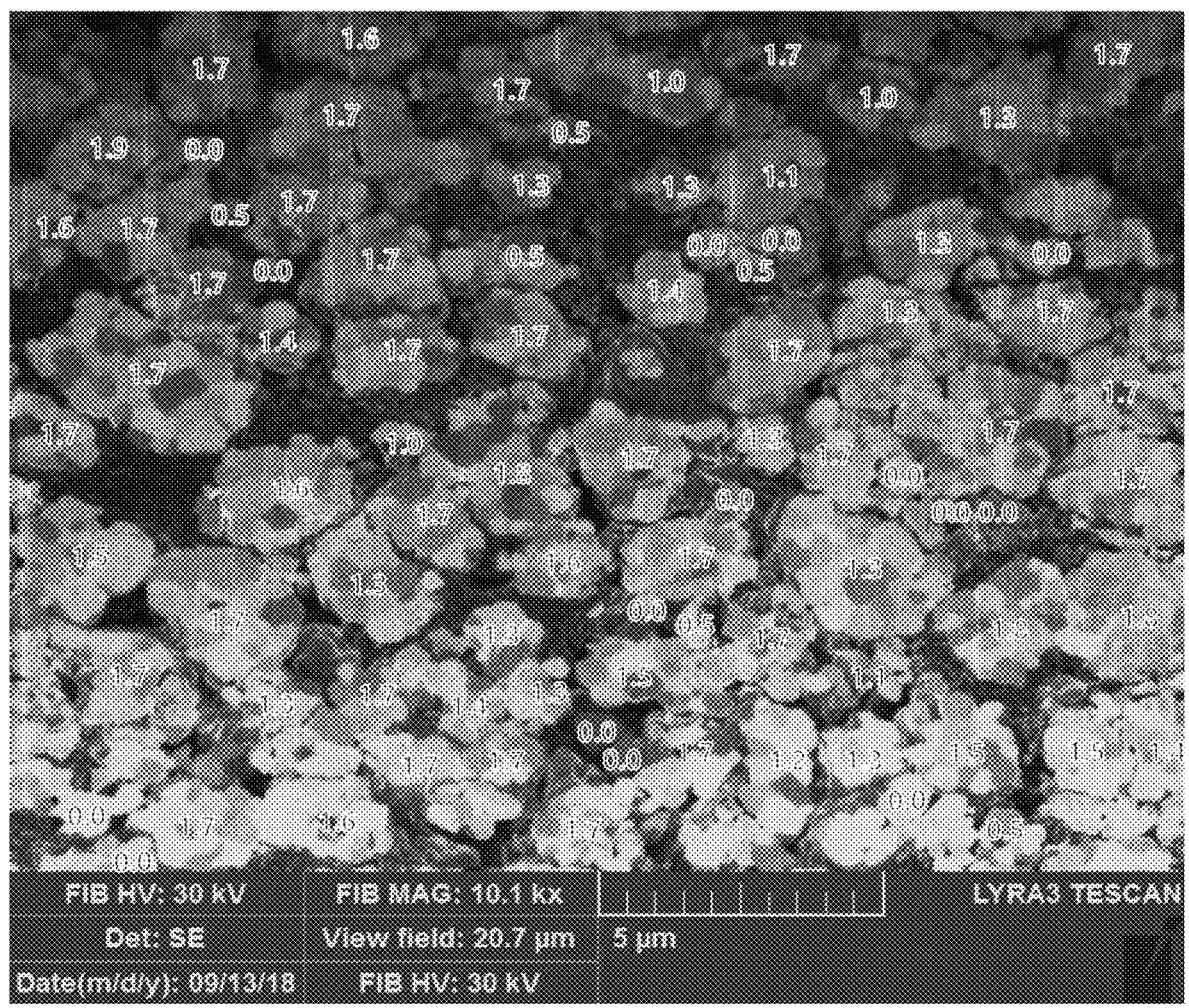
FIG. 11 is a cross-sectional SEM image of the positive electrode active material prepared according to Comparative Example 1, showing the grain boundary density of a secondary particle included in the positive electrode active material.

FIGS. 9 and 10 are cross-sectional SEM images each showing the assembly of secondary particles constituting each of the positive electrode active materials prepared according to Examples 1 and 2 and a primary particle constituting the secondary particle, and FIG. 11 is a cross-sectional SEM image of the positive electrode active material prepared according to Comparative Example 1, and shows the grain boundary density of a secondary particle included in the positive electrode active material.

Referring to FIGS. 9 to 11, compared to the positive electrode active material prepared according to Comparative Example 1, it can be confirmed that the proportion of secondary particles having a grain boundary density of 0.5 or less among a plurality of secondary particles constituting a positive electrode active material is high.

As such, as the proportion of secondary particles having a grain boundary density of 0.5 or less among a plurality of secondary particles constituting the positive electrode active material increases, a side reaction between an electrolyte solution and the grain boundary in the secondary particle may be reduced, and as the proportion of lithium ion diffusion pathways in the same direction as the major axis in the secondary particle increases, the lithium ion conductivity and electron conductivity by the positive electrode active material may be improved.

The result of calculating the grain boundary densities of a secondary particle included in the positive electrode active material prepared according to Examples and Comparative Examples is shown in Table 1 below.

TABLE 1

| Classification | Grain boundary density (fraction %) | |
|---|---|---|
| | 0.5 or less | more than 0.5 |
| Example 1 | 77 | 23 |
| Example 2 | 40 | 60 |
| Example 3 | 42 | 58 |
| Example 4 | 45 | 55 |
| Example 5 | 40 | 60 |
| Example 6 | 40 | 60 |
| Example 7 | 40 | 60 |
| Example 8 | 40 | 60 |
| Example 9 | 40 | 60 |
| Comparative Example 1 | 25 | 75 |
| Comparative Example 2 | 28 | 72 |
| Comparative Example 3 | 29 | 71 |
| Comparative Example 4 | 25 | 75 |
| Comparative Example 5 | 25 | 75 |

TABLE 1-continued

| Classification | Grain boundary density (fraction %) | |
|---|---|---|
| | 0.5 or less | more than 0.5 |
| Comparative Example 6 | 25 | 75 |
| Comparative Example 7 | 25 | 75 |
| Comparative Example 8 | 25 | 75 |

Figure 12:
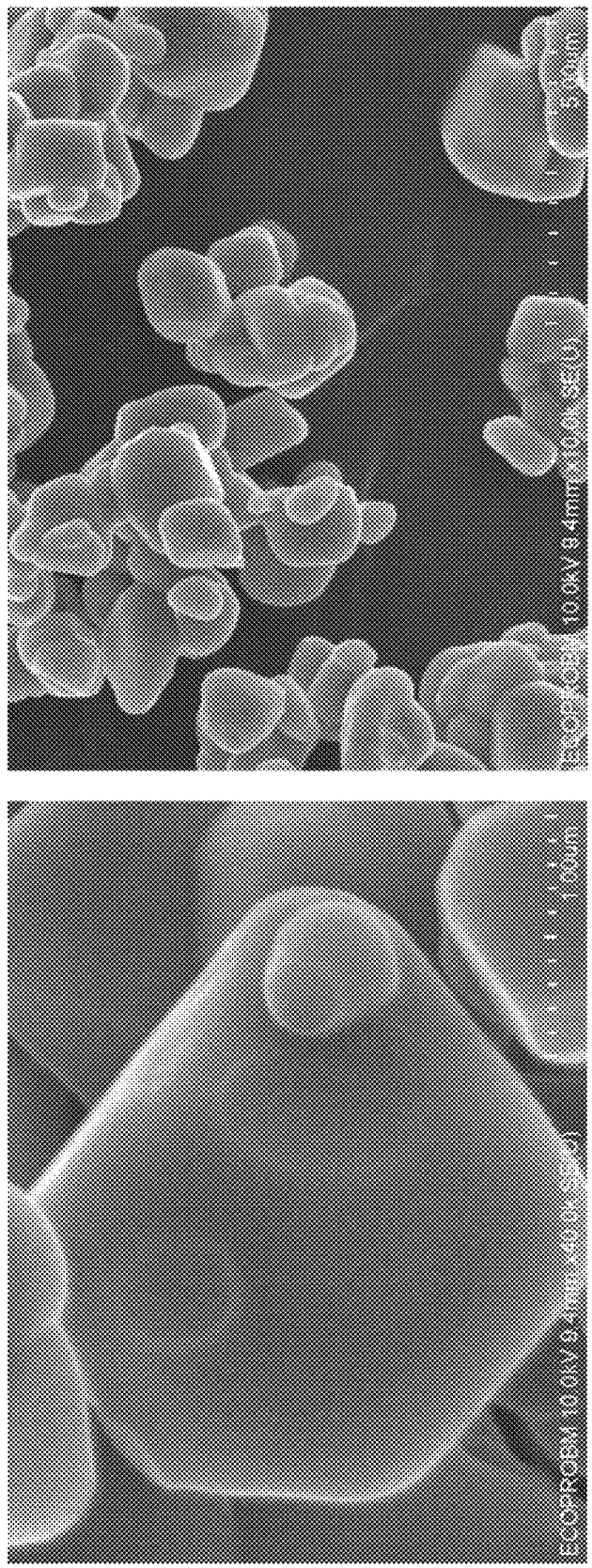
FIGS. 12 and 13 are SEM images of positive electrode active materials prepared according to some exemplary embodiments of the present invention.
Figure 13:
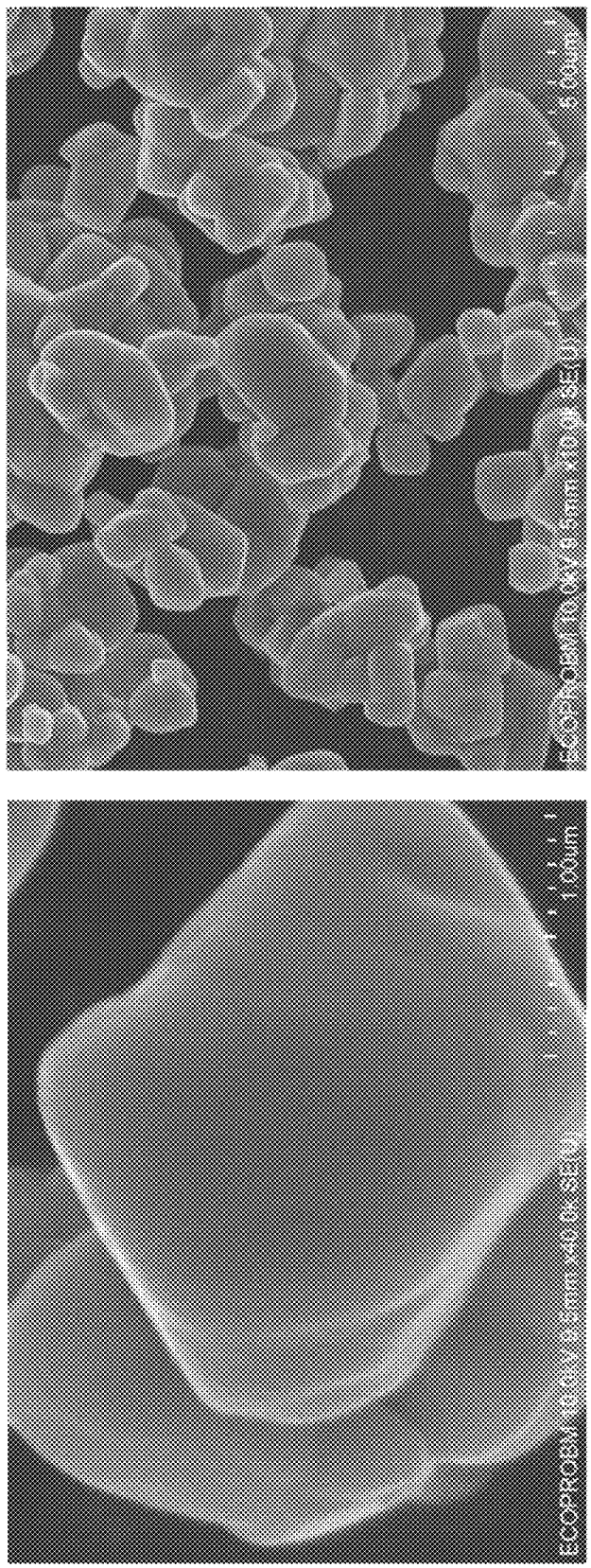

FIGS. 12 and 13 are SEM images of positive electrode active materials prepared according to Example 1 and Example 5, respectively. Compared to FIGS. 12 and 13, it can be confirmed that the surface of the positive electrode active material prepared according to Example 5 shown in FIG. 13 is coated with Co.

Figure 14:
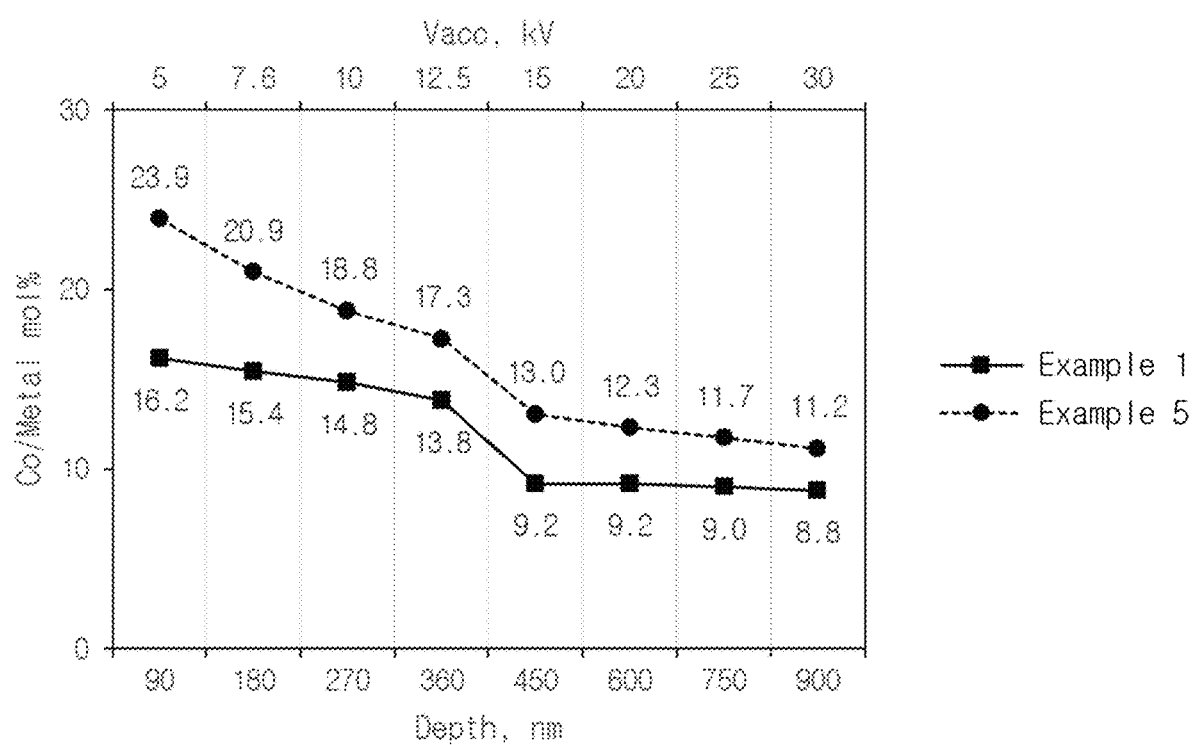
FIG. 14 is a graph showing Co contents measured by EP-EDX analysis for secondary particles constituting positive electrode active materials according to some exemplary embodiments of the present invention.

In addition, referring to FIG. 14, which is a graph showing a Co content measured by EP-EDX analysis on a secondary particle including the positive electrode active material according to each of Examples 1 and 5, it can be confirmed that the positive electrode active material prepared according to Example 5 has a great change in concentration from the surface to the center of the secondary particle, compared to Example 1. Accordingly, it can be confirmed that the surface of the positive electrode active material prepared according to Example 5 is coated with Co.

Experimental Example 2. Measurement of Strength of Positive Electrode Active Material In the preparation of a positive electrode for a lithium secondary battery using a positive electrode active material, a slurry including the positive electrode active material was applied onto a positive electrode current collector, dried and rolled (pressed). Here, particle destruction of the positive electrode active material applied onto the positive electrode current collector in rolling with a high pressure was caused, and thus the performance of the positive electrode active material can be degraded.

In this exemplary embodiment, to confirm a change in strength of the positive electrode active material according to the composition of the assembly of a plurality of secondary particles included in the positive electrode active material, the positive electrode active material prepared each of Example 2 and Comparative Example 1 was prepared, and then the d(10), d(50) and d(90) variations of a particle size distribution before pressing, and after 2.5 t, 4.5 t and 6 t pressing were measured.

The result of measuring the d(10), d(50) and d(90) variations of a particle size distribution after pressing according to each pressure condition is shown in Tables 2 to 4 below.

TABLE 2

| | d(10) variation | |
|---|---|---|
| Press pressure | Example 2 | Comparative Example 1 |
| 2.5t | 4% | 4% |
| 4.5t | 12% | 27% |
| 6.0t | 24% | 43% |

TABLE 3

| | d(50) variation | |
|---|---|---|
| Press pressure | Example 2 | Comparative Example 1 |
| 2.5t | 0% | 9% |
| 4.5t | 13% | 30% |
| 6.0t | 26% | 34% |

TABLE 4

| | d(90) variation | |
|---|---|---|
| Press pressure | Example 2 | Comparative Example 1 |
| 2.5t | 3% | 14% |
| 4.5t | 9% | 34% |
| 6.0t | 18% | 38% |

Referring to Tables 2 to 4, it can be confirmed that the d(10), d(50) and d(90) variations of a particle size distribution before/after pressing of a secondary particle included in the positive electrode active material prepared according to Example 2 are smaller than those of the positive electrode active material prepared according to Comparative Example 1.

Experimental Example 3. Measurement of Electrochemical Characteristics of Positive Electrode Active Material (1) Manufacture of Lithium Secondary Battery To confirm whether, compared with the conventional positive electrode active material, the same or similar level of electrochemical characteristics can be exhibited when a lithium secondary battery is manufactured using the positive electrode active material prepared according to Examples of the present invention, in this experimental example, a lithium secondary battery to which a positive electrode prepared using the positive electrode active material prepared according to each of Examples and Comparative Examples was applied was manufactured.

A slurry was prepared by mixing the prepared positive electrode active material, super-P as a conductive material and PVdF as a binder in a weight ratio of 92:4:4. A positive electrode for a lithium secondary battery was prepared by uniformly applying the slurry to an aluminum film with a thickness of 15 μm and vacuum-drying the slurry at 135° C.

A coin battery was manufactured according to a conventionally known manufacturing process using the positive electrode and lithium foil as counter electrodes, a porous polyethylene film (Celgard 2300, thickness: 25 μm) as a separator, and a liquid electrolyte solution prepared by dissolving $LiPF_6$ in a solvent in which ethylene carbonate and ethyl methyl carbonate were mixed in a volume ratio of 3:7 at a concentration of 1.15M.

(2) Evaluation of Battery Capacity and Lifespan Characteristics of Lithium Secondary Battery The initial charge capacity, initial discharge capacity, initial reversible efficiency and rate characteristics were measured by performing a charging/discharging experiment on the lithium secondary battery manufactured by the above-described method at 25° C., a voltage range of 3.0V to 4.25V, and a discharging rate of 0.5 C to 4.0 C using an electrochemical analyzer (Toyo, Toscat-3100).

In addition, 50 cycles of charging/discharging were performed on the lithium secondary battery manufactured by the above-described method at a temperature of 25° C. in a driving voltage range of 3.0V to 4.25V under a 1 C/1 C condition, and the ratio of the discharge capacity at the 50$^{th}$ cycle to the initial capacity (capacity retention) was measured.

Figure 15:
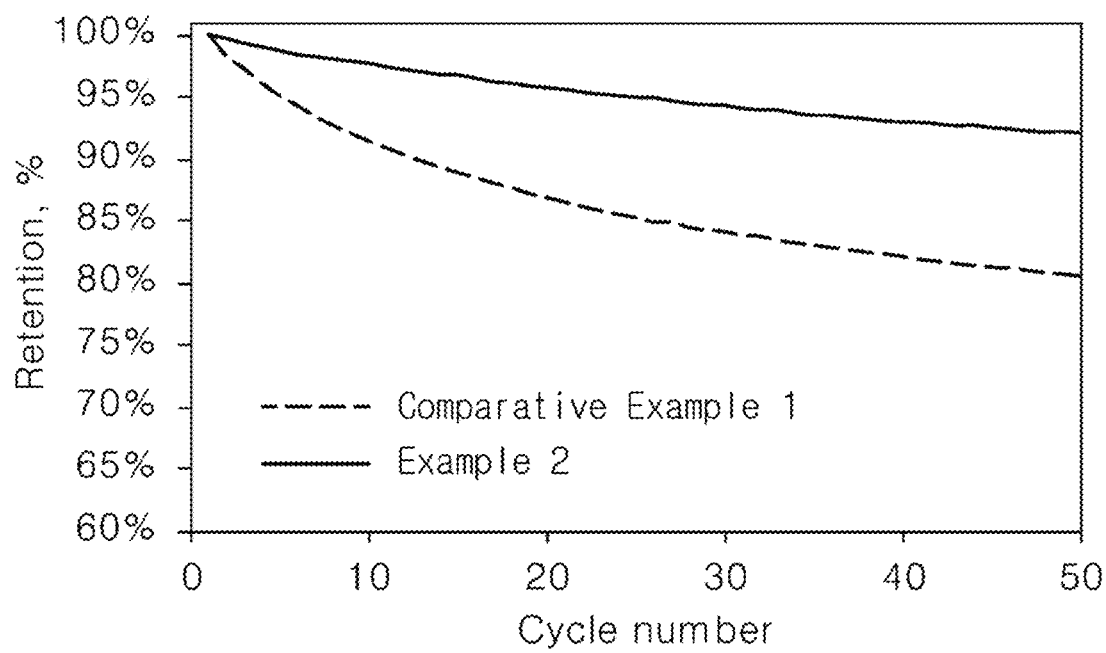
FIG. 15 is a graph showing the result of evaluating a lifespan characteristic according to the cycle number of secondary batteries using positive electrode active materials prepared according to Example 2 and Comparative Example 1.

The result of measuring battery capacity and lifespan characteristics is shown in Tables 5 and 6 and FIG. 15.

TABLE 5

| Classification | Initial charge capacity (mAh/g) | Initial discharge capacity (mAh/g) | Initial reversible efficiency (%) |
|---|---|---|---|
| Example 1 | 230.1 | 197.2 | 85.7 |
| Example 2 | 229.5 | 196.5 | 85.6 |
| Example 3 | 229.1 | 195.9 | 85.5 |
| Example 4 | 229 | 195.3 | 85.3 |
| Example 5 | 229.7 | 220.4 | 88.1 |
| Example 6 | 229.9 | 201.2 | 87.5 |
| Example 7 | 229.4 | 196.1 | 85.5 |
| Example 8 | 229.5 | 196.2 | 85.5 |
| Example 9 | 229.1 | 195.2 | 85.2 |
| Comparative Example 1 | 226.3 | 193.3 | 85.7 |
| Comparative Example 2 | 226.1 | 193.5 | 85.6 |
| Comparative Example 3 | 226 | 193.2 | 85.5 |
| Comparative Example 4 | 227.8 | 200.9 | 88.2 |
| Comparative Example 5 | 227.3 | 199.1 | 87.6 |
| Comparative Example 6 | 226.4 | 193.8 | 85.6 |
| Comparative Example 7 | 226.2 | 193.6 | 85.6 |
| Comparative Example 8 | 226.2 | 192.5 | 85.1 |

TABLE 6

| Classification | Rate characteristic (%) | | | | | Lifespan characteristic (%) |
|---|---|---|---|---|---|---|
| | 0.5 C | 1.0 C | 2.0 C | 3.0 C | 4.0 C | 50 cy |
| Example 1 | 96.5 | 94.1 | 92 | 89.9 | 88.3 | 86.7 |
| Example 2 | 96.8 | 94.4 | 92.1 | 90.4 | 89 | 90.3 |
| Example 3 | 96.7 | 94.2 | 92.1 | 90.1 | 88.8 | 90.8 |
| Example 4 | 96.7 | 94.4 | 91.8 | 90.3 | 88.9 | 90.8 |
| Example 5 | 97.1 | 95 | 92.7 | 91.3 | 89.7 | 92.1 |
| Example 6 | 96.9 | 94.8 | 92.6 | 91.2 | 87.4 | 90.4 |
| Example 7 | 96.5 | 94.2 | 92 | 90 | 88.9 | 90.2 |
| Example 8 | 96.8 | 94.2 | 92.1 | 90.4 | 89.1 | 90.6 |
| Example 9 | 96.7 | 94.3 | 91.8 | 90.3 | 88.8 | 90.7 |
| Comparative Example 1 | 95.4 | 91.8 | 88.1 | 85.3 | 82.6 | 79.8 |
| Comparative Example 2 | 95.8 | 91.9 | 88.3 | 85.7 | 83 | 82.3 |
| Comparative Example 3 | 95.8 | 91.8 | 88.5 | 85.8 | 83.3 | 83.1 |
| Comparative Example 4 | 95.6 | 92.2 | 88.1 | 86.3 | 83.6 | 84.9 |
| Comparative Example 5 | 95.5 | 92.2 | 88.3 | 86.4 | 83.4 | 83.9 |
| Comparative Example 6 | 95.3 | 91.5 | 88.3 | 84.9 | 82.6 | 82.1 |
| Comparative Example 7 | 95.2 | 91.8 | 88.4 | 85.2 | 82.8 | 82.3 |
| Comparative Example 8 | 95.4 | 91.9 | 88 | 85.3 | 82.3 | 82.7 |

Referring to Tables 5 and 6, it can be confirmed that the initial capacity and reversible efficiency of the lithium secondary batteries including the positive electrodes using the positive electrode active materials prepared according to Examples and Comparative Examples are at similar levels, but as a result of a charging/discharging experiment at a discharging rate of 0.5 C to 4.0 C for the lithium secondary batteries including the positive electrodes using the positive electrode active materials prepared according to Examples, compared to Comparative Examples, it can be confirmed that the rate characteristics and lifespan characteristic are higher.

(3) Impedance Change According to High Temperature Storage of Lithium Secondary Battery The impedance of the lithium secondary batteries (Example 1, Example 2, Comparative Example 1 and Comparative Example 2) prepared by the above-described method was measured (amplitude: ±10 mV, frequency range: 0.01 Hz to 10 kHz) before/after high temperature storage at 25° C. using an impedance analyzer (PARSTAT multichannel (PMC) Chassis, METEK) according to a 2-probe method. Storage was performed under a high temperature storage condition, for example, at 60° C. for 168 hours. The result of measuring impedance is shown in FIG. 16 (before high temperature storage) and 17 (after high temperature storage).

Figure 16:
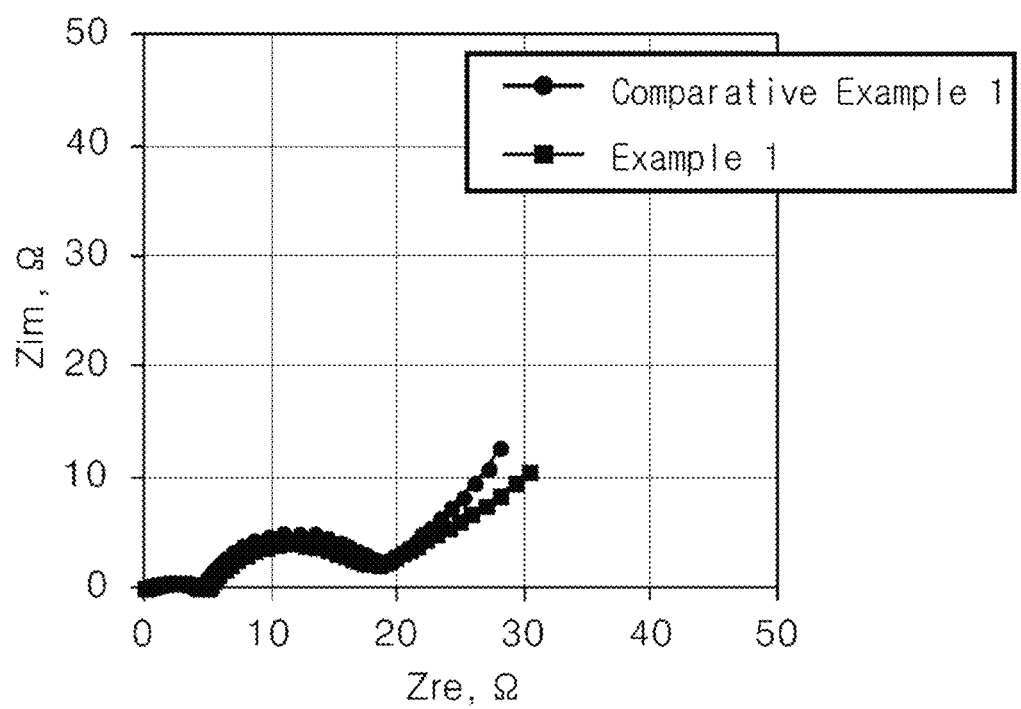
FIGS. 16 and 17 are graphs showing Nyquist plots for the result of measuring impedance before/after high-temperature storage of secondary batteries using positive electrode active materials prepared according to Examples and Comparative Examples.
Figure 17:
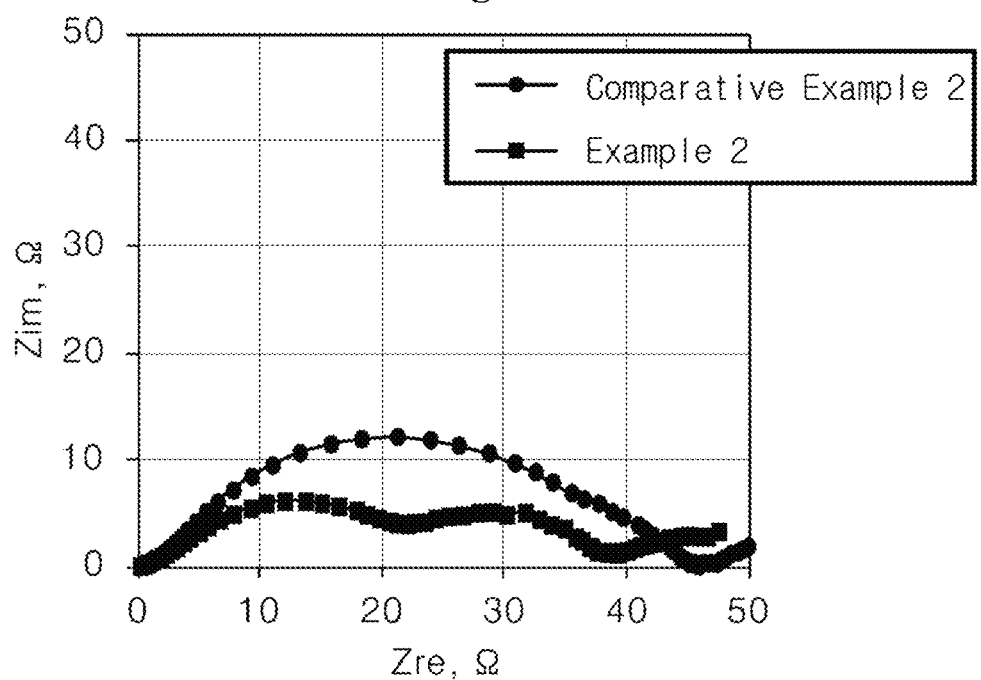

The interfacial resistance of an electrode in the Nyquist plot shown in FIGS. 16 and 17 is determined with the location and size of a hemisphere, and the difference between the left and right x-axis intercepts of the hemisphere indicates the interfacial resistance at the electrode.

Referring to FIGS. 16 and 17, it can be confirmed that, compared to Comparative Example 1 and Comparative Example 2, the lithium secondary batteries prepared using the positive electrode active materials prepared according to Examples 1 and 2 have lower interfacial resistances before/after high temperature storage.

Experimental Example 4. Evaluation of Stability of Positive Electrode Active Material and Secondary Battery (1) Manufacture of Lithium Secondary Battery To confirm whether, compared with the conventional positive electrode active material, the same or similar level of electrochemical characteristics can be exhibited when a lithium secondary battery is manufactured using the positive electrode active material prepared according to Examples of the present invention, in this experimental example, a lithium secondary battery to which a positive electrode prepared using the positive electrode active material prepared according to each of Example 2 and Comparative Example 1 was applied was manufactured.

Specifically, a slurry was prepared by mixing the prepared positive electrode active material, super-P as a conductive material and PVdF as a binder in a weight ratio of 92:4:4. A positive electrode for a lithium secondary battery was prepared by uniformly applying the slurry to an aluminum film with a thickness of 15 μm and vacuum-drying the slurry at 135° C.

A coin battery was manufactured according to a conventionally known manufacturing process using the positive electrode and lithium foil as counter electrodes, a porous polyethylene film (Celgard 2300, thickness: 25 μm) as a separator, and a liquid electrolyte solution prepared by dissolving LiPF$_6$ in a solvent in which ethylene carbonate and ethyl methyl carbonate were mixed in a volume ratio of 3:7 at a concentration of 1.15M.

(2) Measurement of Amount of Gas Generation from Lithium Secondary Battery

The volume change of the lithium secondary battery caused by gas generation in the lithium secondary battery was measured by charging the lithium secondary battery manufactured by the above described method at a constant current of 0.2 C until 4.25V, and storing it at 60° C. for 14 days. The result of measuring the volume change is shown in FIG. 18.

Figure 18:
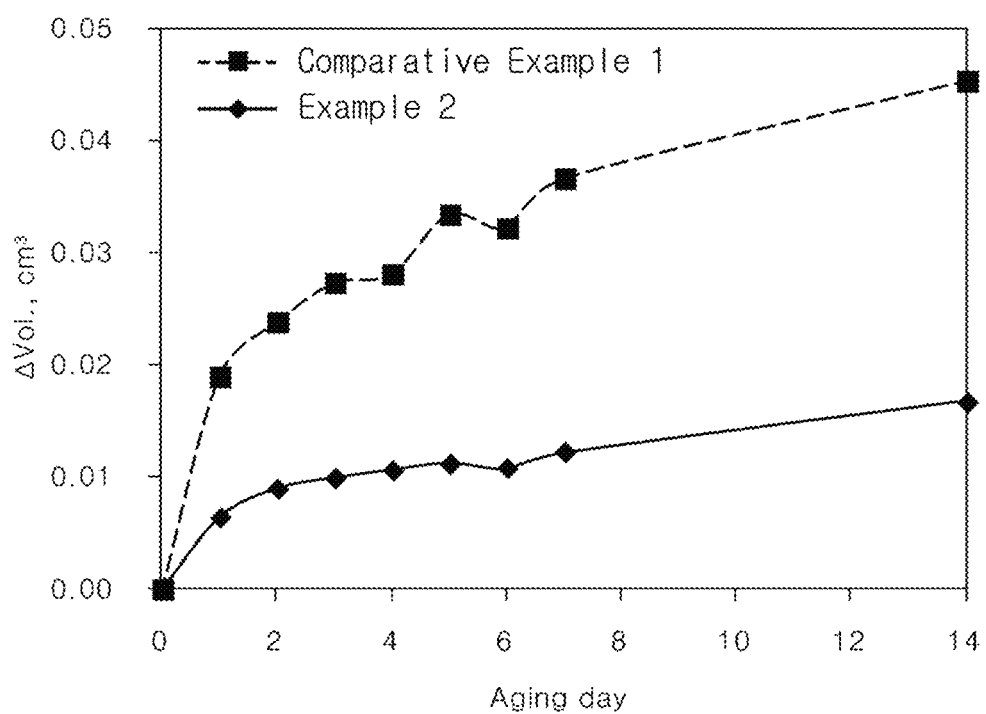
FIG. 18 is a graph showing a volume change according to the number of storing (aging) days of secondary batteries prepared using positive electrode active materials prepared according to Example 2 and Comparative Example 1.

Referring to FIG. 18, it can be confirmed that the amount of gas generation in the lithium secondary battery manufactured using the positive electrode active material prepared according to Example 2 decreases, compared to Comparative Example 1.

When overcharge exceeding the limit flows in the lithium secondary battery, as the internal temperature of the battery rapidly increases, the decomposition of an electrolyte solution is caused and thus gas may be generated. However, in this experiment, since overcurrent does not flow in the lithium secondary battery, it is expected that gas is generated by a side reaction between an electrolyte solution and the interface and surface of the positive electrode active material.

In consideration of this, it can be seen that, compared to Comparative Example 1, as the positive electrode active material prepared according to Example 2 in which the proportion of secondary particles having a small grain boundary density is relatively high has smaller areas of the interface and surface of the secondary particles as well as having a small specific surface area, a side reaction rate with an electrolyte solution decreases, resulting in the reduction of the amount of gas generation.

(3) Evaluation of Thermal Stability

To evaluate the thermal stability of the positive electrode active materials prepared in Example 2 and Comparative Example 1, weight loss was measured at a heating rate of 10° C./min from 25° C. to 350° C. in an Ar atmosphere at atmospheric pressure using a thermogravimetric analyzer (TA Instruments, Q20). The measurement result is shown in FIG. 19.

Figure 19:
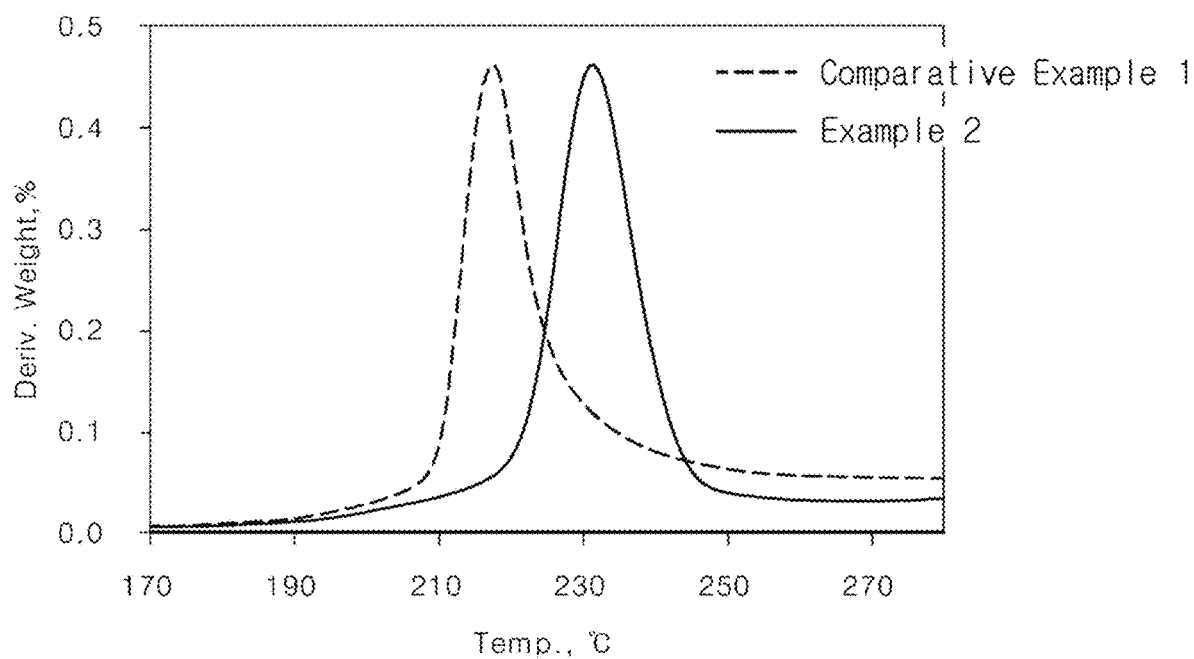
FIG. 19 is a graph showing the result of thermogravimetric analysis for secondary batteries prepared using the positive electrode active materials prepared according to Example 2 and Comparative Example 1.

Referring to FIG. 19, it can be confirmed that, in the case of the positive electrode active material prepared according to Comparative Example 1, the weight loss is generated at approximately 220° C. or less, but in the positive electrode active material prepared according to Example 2, the weight loss is generated at a temperature of approximately 230° C. or more.

In consideration of this, it can be confirmed that the high-temperature stability of the positive electrode active material prepared according to Example 2 is relatively higher than that of Comparative Example 1.

Additionally, after the positive electrodes including the positive electrode active materials prepared according to Example 2 and Comparative Example 1 were charged to 4.3V, 4.4V and 4.6V, the weight loss was measured at a heating rate of 10° C./min from 25 to 350° C. in an Ar atmosphere at atmospheric pressure. The measurement result is shown in Table 7 below.

TABLE 7

| Temperature range | 4.3 V | | 4.4 V | | 4.6 V | |
|---|---|---|---|---|---|---|
| | Example 2 | Comparative Example 1 | Example 2 | Comparative Example 1 | Example 2 | Comparative Example 1 |
| 40° C.~200° C. | 0.3% | 0.4% | 0.5% | 0.7% | 0.4% | 0.7% |
| 200° C.~250° C. | 7.1% | 7.1% | 7.6% | 7.8% | 7.9% | 8.4% |
| 250° C.~350° C. | 3.6% | 4.0% | 3.5% | 3.9% | 3.4% | 3.6% |
| Total | 11.0% | 11.6% | 11.6% | 12.4% | 11.7% | 12.6% |

Referring to the result of Table 7, through thermogravimetric analysis performed after the positive electrode including the positive electrode active material prepared according to each of Example 2 and Comparative Example 1 was charged to 4.3V and 4.4V, it can be confirmed that the difference in weight loss between Example 2 and Comparative Example 1 is not large until 200° C. However, it can be confirmed that the weight loss of Example 2 is smaller than that of Comparative Example 1 under a temperature exceeding 200° C.

Meanwhile, through thermogravimetric analysis performed after the positive electrode including the positive electrode active material prepared according to each of Example 2 and Comparative Example 1 was charged to 4.6V, it can be confirmed that the thermal stability of Example 2 is superior to Comparative Example 1 under most temperature conditions.

Such a result results from the difference in thermal stability of the lattice structure of the positive electrode active material prepared according to each of Example 2 and Comparative Example 1. Particularly, as the lattice structure of the positive electrode active material collapses under a relatively high temperature condition, $O_2$ is emitted from the positive electrode active material, but in the positive electrode active materials according to various Examples of the present invention, the thermal stability of the lattice structure may be improved due to the balance of a grain boundary density.

The specific surface area and grain boundary between secondary particles included in a positive electrode active material are regions in which a side reaction between an electrolyte solution and the interface and surface of the positive electrode active material occurs, and as the specific surface area and grain boundary of the secondary particles are reduced, the high-temperature stability of the positive electrode active material can be improved, and gas generation caused by the positive electrode active material can be reduced.

As described above, the positive electrode active material for a lithium secondary battery according to the present invention includes a secondary particle including a primary particle of lithium-based composite oxide having a single-crystal structure. That is, as the primary particle constituting the secondary particle is formed in a single crystal, the specific surface area and grain boundary of the secondary particle can be reduced.

Further, according to the present invention, the positive electrode active material includes secondary particles having different grain boundary densities, in which each secondary particle included in the positive electrode active material is formed by aggregating 1 to 10 primary particles. Since the secondary particle has a relatively smaller specific surface area than that formed by aggregating tens to hundreds of primary particles, it is possible to reduce the surface area in which a side reaction with an electrolyte solution occurs. In addition, since the number of primary particles forming a secondary particle is small, a grain boundary density decreases, and thus a side reaction at the grain boundary of the secondary particle can also be reduced.

In addition, according to the present invention, as a secondary particle included in the positive electrode active material is formed by aggregating 1 to 10 primary particles, the primary particles in the secondary particle can have an increased possibility of having a lithium ion diffusion pathway in the same direction as the major axis. As described above, as the proportion of the lithium ion diffusion pathways in the same direction as the major axis in the secondary particle increases, lithium ion conductivity and electron conductivity can be improved by the positive electrode active material.

Above, while the examples of the present invention have been described, it will be understood by those of ordinary skill in the art that the present invention may be changed and modified in various ways by addition, alternation, or deletion of components without departing from the spirit of the present invention defined in the appended claims.

What is claimed is:

1. A positive electrode active material for a lithium secondary battery, comprising:
a plurality of secondary particles including a primary particle, which is a lithium-based composite oxide, having a single-crystal structure,
wherein the positive electrode active material is an assembly of first secondary particles, which have a first grain boundary density of 0.5 or less and second secondary particles, which have a second grain boundary density of more than 0.5 and equal to or less than 2.0,
wherein the proportion of the first secondary particles among the plurality of secondary particles constituting the positive electrode active material is 30% or more, Grain boundary density=(the number of boundaries between primary particles in secondary particle/ the number of primary particles constituting secondary particle).

2. The positive electrode active material of claim 1, wherein the primary particle constituting the secondary particle has lithium ion diffusion pathways in the same direction as the major axis.

3. The positive electrode active material of claim 1, wherein the lithium-based composite oxide is represented by Formula 1 below:

$$Li_uNi_{1-(v+w+x+y)}Co_vM1_wM2_xM3_yO_z \quad \text{[Formula 1]}$$

Here, M1 is Mn or Al, and M2 and M3 are each independently selected from Al, B a, B, Ce, Cr, Mg, Mn, Mo, Na, K, P, Sr, Ti, W and Zr, and are different metals (0.95≤u≤1.05, 0≤v≤0.20, 0≤w≤0.20, 0≤x≤0.05, 0≤y≤0.05, and 1.50≤z≤2.1).

4. The positive electrode active material of claim 1, wherein the d(50) variation of a particle size distribution before/after 4.5 ton pressing of the secondary particle is 20% or less.

5. The positive electrode active material of claim 1, wherein the d(50) variation of a particle size distribution before/after 2.5 ton pressing of the secondary particle is 3% or less.

6. The positive electrode active material of claim 1, wherein the d(50) variation of a particle size distribution before/after 6.0 ton pressing of the secondary particle is 30% or less.

7. The positive electrode active material of claim 1, wherein the primary particle has an average particle diameter of 0.01 to 20 μm.

8. The positive electrode active material of claim 1, further comprising a coating layer covering at least a part of the interface between the primary particles and the surface of the secondary particle, the coating layer comprising at least one oxide represented by Formula 2 below:

$$Li_aA_bO_c \quad \text{[Formula 2]}$$

(Here, A is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd and Nd, 0≤a≤6, 0≤b≤4, and 2≤c≤8).

9. The positive electrode active material of claim 1, wherein, when the positive electrode including the positive electrode active material is charged to 4.4 to 4.6V, and subjected to thermogravimetric analysis at a heating rate of 10° C./min from 25° C. to 350° C. in an Ar atmosphere at atmospheric pressure, a weight decrease rate of the positive electrode is 12.3% or less at the time of reaching 350° C.

10. A lithium secondary battery comprising a positive electrode including the positive electrode active material of claim 1.

11. A positive electrode active material for a lithium secondary battery, comprising:
- a plurality of secondary particles including a primary particle, which is a lithium-based composite oxide, having a single-crystal structure,
- wherein the positive electrode active material is an assembly of first secondary particles, which have a grain boundary density of 0.5 or less and second secondary particles, which does not have a grain boundary density of more than 0.5 and equal to or less than 2.0,
- wherein the proportion of the first secondary particles among the plurality of secondary particles constituting the positive electrode active material is be 30% or more, Grain boundary density=(the number of boundaries between primary particles in secondary particle/ the number of primary particles constituting secondary particle), wherein the second secondary particles comprise a second aggregate including 3 to 6 primary particles and a third aggregate including 7 to 10 primary particles, wherein the proportion of the second aggregate among the assembly of the secondary particles is 20% or more and 70% or less.

* * * * *